United States Patent
Tateishi et al.

(10) Patent No.: US 12,207,654 B2
(45) Date of Patent: *Jan. 28, 2025

(54) BACTERICIDAL AGENT FOR AGRICULTURAL OR HORTICULTURAL USE, PLANT DISEASE CONTROL METHOD, AND PRODUCT FOR PLANT DISEASE CONTROL USE

(71) Applicant: Kureha Corporation, Tokyo (JP)

(72) Inventors: Hideaki Tateishi, Tokyo (JP); Erina Kimura, Tokyo (JP); Tatsuyuki Koshiyama, Tokyo (JP); Mayumi Ishikawa, Tokyo (JP)

(73) Assignee: Kureha Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/594,373

(22) PCT Filed: Apr. 20, 2020

(86) PCT No.: PCT/JP2020/016993
§ 371 (c)(1),
(2) Date: Oct. 13, 2021

(87) PCT Pub. No.: WO2020/213739
PCT Pub. Date: Oct. 22, 2020

(65) Prior Publication Data
US 2022/0217978 A1   Jul. 14, 2022

(30) Foreign Application Priority Data
Apr. 19, 2019   (JP) ................. 2019-080497

(51) Int. Cl.
*A01N 43/653* (2006.01)
*A01N 43/50* (2006.01)
*A01P 3/00* (2006.01)

(52) U.S. Cl.
CPC .......... *A01N 43/50* (2013.01); *A01N 43/653* (2013.01); *A01P 3/00* (2021.08)

(58) Field of Classification Search
CPC ...... A01N 43/50; A01N 43/653; A01N 37/50; A01N 43/30; A01N 43/40; A01N 43/54; A01N 43/56; A01N 43/713; A01N 43/88; A01N 47/18; A01P 3/00
USPC ....................................................... 504/272
See application file for complete search history.

(56) References Cited

U.S. PATENT DOCUMENTS

| | | | |
|---|---|---|---|
| 4,533,659 A | 8/1985 | Eckhardt et al. | |
| 4,886,892 A | 12/1989 | Zerbes et al. | |
| 10,053,436 B2 | 8/2018 | Gebhardt et al. | |
| 10,358,426 B2 | 7/2019 | Dietz et al. | |
| 10,897,897 B2 | 1/2021 | Gewehr et al. | |
| 10,945,434 B2 | 3/2021 | Harigae et al. | |
| 2007/0066669 A1* | 3/2007 | Mauler-Machnik | A01N 43/30 514/383 |
| 2008/0269263 A1 | 10/2008 | Dahmen et al. | |
| 2012/0088660 A1 | 4/2012 | Renner et al. | |
| 2012/0108422 A1 | 5/2012 | Renner et al. | |
| 2013/0096299 A1 | 4/2013 | Kusano et al. | |
| 2014/0155262 A1 | 6/2014 | Dietz et al. | |
| 2014/0296535 A1 | 10/2014 | Kanno | |
| 2015/0051231 A1* | 2/2015 | Borges | A01N 43/653 514/269 |
| 2015/0218134 A1 | 8/2015 | Masano et al. | |
| 2015/0313225 A1 | 11/2015 | Lohmann et al. | |
| 2015/0344445 A1 | 12/2015 | Lohmann et al. | |
| 2016/0227772 A1 | 8/2016 | Gewehr et al. | |
| 2017/0081296 A1 | 3/2017 | Dietz et al. | |
| 2017/0166540 A1 | 6/2017 | Gebhardt et al. | |

(Continued)

FOREIGN PATENT DOCUMENTS

| | | |
|---|---|---|
| AU | 2018365928 B2 | 5/2019 |
| CA | 3071569 A1 | 5/2019 |

(Continued)

OTHER PUBLICATIONS

Plant Disease: Pathogens and Cycles [online]. CropWatch, 2019 [retrieved on Oct. 15, 2023]. Retrieved from the internet: <https://web.archive.org/web/20191018181244/https://cropwatch.unl.edu/soybean-management/plant-disease>. (Year: 2019).*

(Continued)

*Primary Examiner* — Katherine Peebles
(74) *Attorney, Agent, or Firm* — Abel Schillinger, LLP

(57) ABSTRACT

Provided is an agricultural or horticultural fungicide that has low toxicity to humans and animals, that is excellent in handling safety, and that has an excellent controlling effect against a wide range of plant diseases and a high antimicrobial action against plant disease fungi.

The agricultural or horticultural fungicide of the present invention includes, as an active ingredient, an azole derivative represented by the following general formula (I) and other active ingredients.

[Chem. 1]

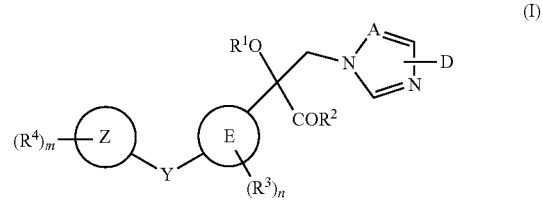

(I)

3 Claims, No Drawings

(56) References Cited

U.S. PATENT DOCUMENTS

| | | |
|---|---|---|
| 2018/0199569 A1 | 7/2018 | Gewehr et al. |
| 2020/0288714 A1 | 9/2020 | Harigae et al. |
| 2021/0186016 A1 | 6/2021 | Gewehr et al. |
| 2023/0271929 A1 | 8/2023 | Harigae et al. |

FOREIGN PATENT DOCUMENTS

| | | | |
|---|---|---|---|
| CL | 2020000546 A1 | 7/2020 | |
| CN | 102491959 A | 6/2012 | |
| CN | 103059004 A | 4/2013 | |
| CN | 103649057 A | 3/2014 | |
| CN | 103930417 A | 7/2014 | |
| CN | 104540818 A | 4/2015 | |
| CN | 105050406 A | 11/2015 | |
| CN | 111032631 A | 4/2020 | |
| CO | 2020002329 A2 | 4/2020 | |
| EA | 202090456 A2 | 7/2020 | |
| EP | 0096660 A1 | 12/1983 | |
| EP | 0099165 A1 | 1/1984 | |
| EP | 0619812 A1 | 10/1994 | |
| EP | 2731935 B1 | 3/2016 | |
| EP | 3712135 A1 | 9/2020 | |
| EP | 3957177 A1 | 2/2022 | |
| JP | 58-170770 A | 10/1983 | |
| JP | 59-31766 A | 2/1984 | |
| JP | S59206375 A | 11/1984 | |
| JP | 2012530109 A | 11/2012 | |
| JP | 2012530110 A | 11/2012 | |
| JP | 2014-520832 A | 8/2014 | |
| JP | 2016-535007 A | 11/2016 | |
| JP | 2019-48845 A | 3/2019 | |
| WO | 1993/011118 A1 | 6/1993 | |
| WO | 2011/136268 A1 | 11/2011 | |
| WO | 2012/125533 A1 | 9/2012 | |
| WO | WO-2013007767 A1 * | 1/2013 | ........... A01N 43/653 |
| WO | 2013144105 A1 | 10/2013 | |
| WO | 2014/082871 A1 | 6/2014 | |
| WO | 2014/082881 A1 | 6/2014 | |
| WO | 2014/095548 A1 | 6/2014 | |
| WO | 2014/095672 A1 | 6/2014 | |
| WO | WO-2014095994 A1 * | 6/2014 | ............. A01N 25/00 |
| WO | 2015055755 A1 | 4/2015 | |
| WO | 2015/185708 A1 | 12/2015 | |
| WO | 2016005211 A1 | 1/2016 | |
| WO | 2017/029179 A1 | 2/2017 | |
| WO | 2018/145921 A1 | 8/2018 | |
| WO | 2019/093522 A1 | 5/2019 | |
| WO | 2020213739 A1 | 10/2020 | |
| WO | 2021/170830 A1 | 9/2021 | |

OTHER PUBLICATIONS

Emami et al. Current Medicinal Chemistry vol. 30, pp. 220-249. (Year: 2023).*

Office Action for CA Application No. 3135695, dated Nov. 18, 2022, 3 pages.

Extended European Search Report for International Application No. PCT/JP2020/016993, Dated Apr. 28, 2022.

Office Action for Australian Patent Application No. 2020257751 dated Nov. 25, 2021.

Office Action for CN Application No. 202080027996.9, dated Oct. 21, 2022, 4 pages.

English translation of Office Action for CN Application No. 202080027996.9, dated Oct. 21, 2022, 7 pages.

The Eurasian Patent Organization (EAPO) Date of mailing: Jan. 13, 2022; Application No. 202192756; Notification.

Canadian Office Action for Application No. 3,135,695, Dated Apr. 27, 2022.

International Preliminary Report on Patentability for PCT/JP2020/016993, dated Oct. 28, 2021.

EA Office Action for Application No. 202192756/28, Dated May 31, 2022.

International Search Report for International Application No. PCT/JP2020/016993 dated Jun. 16, 2020.

Chinese Office Action Issued for Chinese Application No. 2020800279969, Dated May 17, 2022.

Office Action for Korean Patent Application No. 10-2021-7037146, Dated Feb. 14, 2022.

Office Action for CO Application No. NC2021/0015225, dated Nov. 9, 2022, 8 pages.

English translation of Office Action for CO Application No. NC2021/0015225, dated Nov. 9, 2022, 13 pages.

Office Action for Indian Application No. 202117048015, Dated Mar. 4, 2022.

Non-Final Office Action for U.S. Appl. No. 16/636,502, now U.S. Pat. No. 10,945,434, dated Jul. 21, 2020, 34 pages.

Guo, S. et al., "Metal-free oxidative esterification of acetophenones with alcohols: a facile one-pot approach to a-ketoesters," RSC Advances, published on Oct. 11, 2016, vol. 6, No. 100, retrieved on Nov. 22, 2019, pp. 98422-98426.

Yang, L. et al., "Synthesis of Pelorol and Analogues: Activators of the Inositol 5-Phosphatase SHIP," Organic Letters, published on Feb. 16, 2005, vol. 7, No. 6, pp. 1073-1076.

International Search Report of the International Searching Authority for PCT/JP2018/041971 with mailing date of Jan. 15, 2019.

English translation of International Search Report of the International Searching Authority for PCT/JP2018/041971 with mailing date of Jan. 15, 2019

Written Opinion of the International Preliminary Examining Authority of PCT/JP2018/041971 with mailing date of Jan. 15, 2019.

English translation of Written Opinion of the International Preliminary Examining Authority of PCT/JP2018/041971 with mailing date of Jan. 15, 2019.

Notification of Reasons for Refusal of the Intellectual Property Office of Japan for JP 2019-552425 with mailing date of Apr. 7, 2020.

English translation of Notification of Reasons for Refusal of the Intellectual Property Office of Japan for JP 2019-552425 with mailing date of Apr. 7, 2020.

Office Action of the Intellectual Property Office of Canada for CA 3,071,569 with mailing date of Apr. 6, 2020.

Translation of the International Preliminary Report on Patentability (Chapter 1) for PCT/JP2018/041971 with issue date of May 19, 2020.

Notification of Reason for Refusal of the Intellectual Property Office of Korea for KR 10-2020-7002610 with mailing date of May 1, 2020.

English translation of Notification of Reason for Refusal of the Intellectual Property Office of Korea for KR 10-2020-7002610 with mailing date of May 1, 2020.

Search Report of the Intellectual Property Office of China for CN 201880050458.4 with search date of Jun. 3, 2020.

Office Action of the Intellectual Property Office of China for CN 201880050458.4 with mailing date of Jun. 11, 2020.

English translation of Search Report of the Intellectual Property Office of China for CN 201880050458.4 with search date of Jun. 3, 2020.

English translation of Office Action of the Intellectual Property Office of China for CN 201880050458.4 with mailing date of Jun. 11, 2020.

Examination Report of the Intellectual Property Office of India for IN 202017003921 with mailing date of Jun. 11, 2020.

Office Action of the Intellectual Property Office of Eurasian Patent Organization for EA 202090456 with mailing date of Jun. 11, 2020.

English translation of Office Action of the Intellectual Property Office of Eurasian Patent Organization for EA 202090456 with mailing date of Jun. 11, 2020.

Examination Report of the Intellectual Property Office of India for IN 202017003921 with mailing date of Jun. 11, 2020, 3 pages.

Office Action of the Intellectual Property Office of Eurasian Patent Organization for EA 202090456 with mailing date of Jun. 11, 2020, 5 pages.

English translation of Office Action of the Intellectual Property Office of Eurasian Patent Organization for EA 202090456 with mailing date of Jun. 11, 2020, 3 pages.

(56) References Cited

OTHER PUBLICATIONS

Partial Supplementary European Search Report for European Patent Application 18876885.7 dated Aug. 6, 2020, 11 pages.
Yu-Xiu Liu, et al, "Design, synthesis and acaricidal/insecticidal activities of etoxazole analogues", New Journal of Chemistry, vol. 37, No. 6, Jan. 1, 2013, pp. 1803-1810, XP055717562.
Kiuling Yu, et al, "Design, synthesis and acaricidal/insecticidal . . . "; Journal of Agricultural and Food Chemistry, 2016, vol. 64(15), pp. 3034-3040.
Office Action from Chilean Patent Application No. 2020-00546 dated Nov. 9, 2020, 33 pages.
Office Action from Eurasian Patent Application No. 202090456, dated Nov. 20, 2020, 4 pages.
Office Action from Chinese Patent Application No. 201880050458.4, dated Nov. 13, 2020, 17 pages.
Office Action from Patent Application 273066 mailed Sep. 29, 2020, 6 pages.
Atkinson, David C., et al., "Substituted (2-Phenoxyphenyl) Acetic Acids with Antiinflammatory Activity", Journal of Medicinal Chemistry, 1983, vol. 25, No. 10, 8 pages.
Extended European Search Report for European Patent Application No. 18876885.7, 11 pages.
Office Action from Colombian Patent Application No. NC2020/0002329 dated Nov. 24, 2020, 15 pages.
Office Action from Mexican Patent Application No. MX/a/2020/002380 dated Jan. 12, 2021, 9 pages.
"Office Action from Ukrainian Patent Application No. a202000480 dated Feb. 17, 2021, 5 pages.Note: The Ukrainian examiner confirmed that D4, WO2013/007776A1, was typed incorrectly in the attached Ukrainian Office Action. It should have been typed as WO2013/007767A1."
Office Action from Chilean Patent Application No. 00546-2020 dated Mar. 4, 2021, with translation, 33 pages.
Office Action for PH Application No. 1-2020-550075, dated Nov. 11, 2022, with translation, 4 pages.
Office Action for MX Application No. MX/a/2020/002380, dated Jul. 2, 2021, with translation, 6 pages.
Office Action for EP Application No. 18876885.7, dated Jun. 30, 2022, 4 pages.
Office Action for EP Application No. 18876885.7, dated Jan. 11, 2022, 4 pages.
Office Action for EP Application No. 18876885.7, dated Jun. 23, 2021, 5 pages.
Office Action for EA Application No. 202090456, dated Oct. 5, 2021, with translation, 4 pages.
Office Action for EA Application No. 202090456, dated Mar. 26, 2021, with translation, 6 pages.
Office Action for CL Application No. 00546-2020, dated Jul. 9, 2021, with translation, 6 pages.
Office Action for BR Application No. BR112020002160-1, dated Sep. 20, 2022, with translation, 6 pages.
Office Action for CL Application No. 202102743, dated Feb. 14, 2023, 15 pages.
English translation of Office Action for CL Application No. 202102743, dated Feb. 14, 2023, 12 pages.
Office Action for CO Application No. NC2021/0015225, dated Feb. 21, 2023, 9 pages.
English translation of Office Action for CO Application No. NC2021/0015225, dated Feb. 21, 2023, 9 pages.
Office Action for PH Application No. 1-2021-552560, dated Mar. 13, 2023, 6 pages.
Office Action for EP Application No. 20791025.8, dated Mar. 22, 2023, 9 pages.
Office Action for PH Application No. 1-2020-550075, dated Apr. 3, 2023, 4 pages.
Office Action for CN Application No. 202080027996.9, dated Feb. 9, 2023, 4 pages.
English translation of Office Action for CN Application No. 202080027996.9, dated Feb. 9, 2023, 6 pages.
Office Action for CR Application No. 2020-0103, dated Apr. 28, 2023, 9 pages.
English translation of the Office Action for CR Application No. 2020-0103, dated Apr. 28, 2023, 6 pages.
Office Action for UA Application No. A202106007, dated May 3, 2023, 5 pages.
English translation of the Office Action for UA Application No. A202106007, dated May 3, 2023, 6 pages.
Office Action for PH Application No. 1-2020-550075, dated Aug. 11, 2023, 4 pages.
Office Action for EP Application No. 20791025.8, dated Sep. 7, 2023, 4 pages.
Hearing Notice for IN Application No. 202117048015, dated Sep. 6, 2023, 3 pages.
Hearing Notice for IN Application No. 202017003921, dated Aug. 3, 2023, 2 pages.
Office Action for NZ781580, dated Oct. 18, 2023, 3 pages.
Office Action for NZ781580, dated Nov. 27, 2023, 3 pages.
English translation of the International Preliminary Report on Patentability for PCT Application No. PCT/JP2021/029343, mailed Feb. 16, 2023, 6 pages.
Office Action for IN202317005660, dated Nov. 2, 2023, 6 pages.
Office Action for CN202180060304.5, dated Jan. 15, 2024, 6 pages.
English Translation of the Office Action for CN202180060304.5, dated Jan. 15, 2024, 7 pages.
Raghunadh, et al., "An Efficient and Practical Synthesis of Aryl and Hetaryl a-Keto Esters", Technology Development Centre, Custom Pharmaceutical Services, Dr. Reddy's Laboratories Ltd., Miyapur. Hyderabad. 500 049, India; Received Jul. 14, 2011; revised Nov. 3, 2011.
Son, et al., "High Potency Phenylquinoxalinone Cystic Fibrosis Transmembrane Conductance Regulator (CFTR) Activators", Department of Chemistry, University of California, Davis, California 95616, United States, Feb. 23, 2017.
"Kambale, et al., ""Lewis acid catalyzed cascade annulation of alkynols with a-ketoesters: a facile access to y-spiroketal-y-lactones""", Chem Commun, 2017; 53, 6641".
Office Action for BR112020002160-1, dated Feb. 26, 2024, 5 pages.
Translation of Office Action for BR1120200021601, dated Feb. 26, 2024, 5 pages.
Extended European Search Report for EP21853755.3, mailed Jul. 16, 2024, 5 pages.
Office Action for CR Application No. 2020-0103, dated Oct. 8, 2024, 7 pages.
English translation of Office Action for CR Application No. 2020-0103, dated Oct. 8, 2024, 7 pages.

* cited by examiner

BACTERICIDAL AGENT FOR AGRICULTURAL OR HORTICULTURAL USE, PLANT DISEASE CONTROL METHOD, AND PRODUCT FOR PLANT DISEASE CONTROL USE

TECHNICAL FIELD

The present invention relates to an agricultural or horticultural fungicide, a method of controlling plant diseases, and a product for controlling plant diseases. Specifically, the present invention relates to an agricultural or horticultural fungicide including a plurality of active ingredients, a method of controlling plant diseases using the fungicide, and a product for controlling plant diseases including a plurality of active ingredients separately.

BACKGROUND ART

There has been a need for agricultural or horticultural fungicides that have low toxicity to humans and animals, excellent safety in handling, and a high controlling effect on a wide range of plant diseases. Azole fungicides are known as agricultural or horticultural fungicides having a high controlling effect.

CITATION LIST

Patent Document

Patent Document 1: JP 2014-520832 T
Patent Document 2: JP 58-170770 A

SUMMARY OF INVENTION

Technical Problem

In the field of disease control by agricultural or horticultural fungicides, there are problems such as the impact on non-target organisms and the environment, and the emergence of chemical-resistant fungi. Therefore, in order to reduce the toxicity to non-target organisms and environmental damages, as well as to suppress the emergence of chemical resistance, there is a need for chemicals that can provide a high controlling effect while reducing the dispersion quantity of chemicals.

The present invention has been made in view of the above problems, and an object of the present invention is to provide an agricultural or horticultural fungicide that meets the above demands.

Solution to Problem

In order to solve the above problems, the present inventors have studied intensively and found that an azole derivative represented by the following general formula (I) has excellent activity, and that a mixed formulation of the azole derivative and another active ingredient achieves a synergistic effect, and thus have completed the present invention.

The agricultural or horticultural fungicide of the present invention includes an azole derivative represented by the following general formula (I) as an active ingredient, and further includes another active ingredient:

wherein

[Chem. 1]

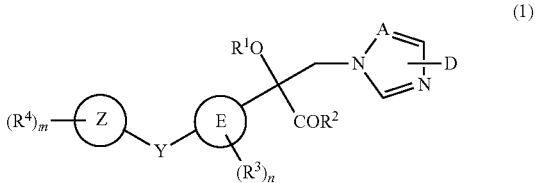

(1)

A is N or CH;
D is hydrogen, a halogen group, or $SR^D$;
where $R^D$ is hydrogen, a cyano group, $C_1$-$C_6$-alkyl group, $C_1$-$C_6$-haloalkyl group, $C_2$-$C_6$-alkenyl group, $C_2$-$C_6$-haloalkenyl group, $C_2$-$C_6$-alkynyl group, or $C_2$-$C_6$-haloalkynyl group;
$R^1$ is hydrogen, a $C_1$-$C_6$-alkyl group, $C_2$-$C_6$-alkenyl group, $C_2$-$C_6$-alkynyl group, $C_3$-$C_8$-cycloalkyl group, $C_3$-$C_8$-cycloalkyl-$C_1$-$C_4$-alkyl group, phenyl group, phenyl-$C_1$-$C_4$-alkyl group, phenyl-$C_2$-$C_4$-alkenyl group, phenyl $C_2$-$C_4$-alkynyl group, or $COXR^5$;
where $R^5$ is hydrogen, a $C_1$-$C_6$-alkyl group, $C_2$-$C_6$-alkenyl group, $C_2$-$C_6$-alkynyl group, $C_3$-$C_8$-cycloalkyl group, $C_3$-$C_8$-cycloalkyl-$C_1$-$C_4$-alkyl group, phenyl group, phenyl-$C_1$-$C_4$-alkyl group, phenyl-$C_2$-$C_4$-alkenyl group, or phenyl-$C_2$-$C_4$-alkynyl group;
X is a single bond, —O—, or —$NR^6$—;
$R^6$ is hydrogen, a $C_1$-$C_6$-alkyl group, $C_2$-$C_6$-alkenyl group, $C_2$-$C_6$-alkynyl group, $C_3$-$C_8$-cycloalkyl group, $C_3$-$C_8$-cycloalkyl-$C_1$-$C_4$-alkyl group, phenyl group, phenyl-$C_1$-$C_4$-alkyl group, phenyl-$C_2$-$C_4$-alkenyl group, or phenyl-$C_2$-$C_4$-alkynyl group, where $R^5$ and $R^6$ may form a ring;
$R^2$ is —$OR^7$ or —$NR^8R^9$;
$R^7$, $R^8$, and $R^9$ are each independently hydrogen, a $C_1$-$C_6$-alkyl group, $C_2$-$C_6$-alkenyl group, $C_2$-$C_6$-alkynyl group, $C_3$-$C_8$-cycloalkyl group, $C_3$-$C_8$-cycloalkyl-$C_1$-$C_4$-alkyl group, phenyl group, phenyl-$C_1$-$C_4$-alkyl group, phenyl-$C_2$-$C_4$-alkenyl group, or phenyl-$C_2$-$C_4$-alkynyl group, where $R^8$ and $R^9$ may form a ring;
the aliphatic groups in $R^1$, $R^2$, $R^5$, $R^6$, $R^7$, $R^8$, and $R^9$ may have 1, 2, 3, or a maximum possible number of the same or different groups $R^a$s, where $R^a$s are independently selected from a halogen group, cyano group, nitro group, $C_1$-$C_4$-alkoxy group, and $C_1$-$C_4$-haloalkoxy group;
$R^4$ is a halogen group, cyano group, nitro group, amino group, phenyl group, phenyl-oxy group, $C_1$-$C_4$-alkyl group, $C_1$-$C_4$-haloalkyl group, $C_1$-$C_4$-alkoxy group, or $C_1$-$C_4$-haloalkoxy group, $C_1$-$C_4$-alkylamino group, $C_1$-$C_4$-dialkylamino group, $C_1$-$C_4$-alkylacylamino group, —$SOR^{10}$, or —$SF_5$;
the cycloalkyl group or phenyl moiety in $R^1$, $R^2$, $R^5$, $R^6$, $R^7$, $R^8$, and $R^9$ or the phenyl moiety in $R^4$ may have 1, 2, 3, 4, 5, or a maximum possible number of the same or different groups $R^b$s, where $R^b$ are independently selected from a halogen group, cyano group, nitro group, $C_1$-$C_4$-alkyl group, $C_1$-$C_4$-alkoxy group, $C_1$-$C_4$-haloalkyl group, and $C_1$-$C_4$-haloalkoxy group;
$R^3$ is a halogen group, cyano group, nitro group, phenyl group, phenyl-oxy group, $C_1$-$C_4$-alkyl group, $C_1$-$C_4$-haloalkyl group, $C_1$-$C_4$-alkoxy group, $C_1$-$C_4$-haloalkoxy group, —$SOR^{10}$, or —$SF_5$;

where $R^{10}$ is a $C_1$-$C_4$-alkyl group or $C_1$-$C_4$-haloalkyl group;

E is a phenyl group or a 6-membered aromatic heterocyclic ring containing 1 or 2 N atoms;

n $R^3$s are bonded at any substitution positions;

when E is a phenyl group, n is 0, 1, 2, 3, or 4, when E is a 6-membered aromatic heterocyclic ring containing 1 or 2 N atoms, n is 0, 1, or 2;

Y is an oxygen atom, —$CH_2O$—, —$OCH_2$—, —NH—, —N(—$C_1$-$C_4$-alkyl)-, —N(—$C_3$-$C_6$-cycloalkyl)-, or —$S(O)_p$— bonded to any position of E;

p is 0, 1, or 2;

Z is an aromatic hydrocarbon group that is a phenyl or naphthyl group, a 5- or 6-membered aromatic heterocyclic ring containing from 1 to 4 heteroatoms selected from O, N, or S, or a 9- or 10-membered aromatic heterocyclic ring consisting of two rings;

m $R^4$s are bonded at any substitution positions; and when Z is an aromatic hydrocarbon group, m is 1, 2, 3, 4, or 5, and when Z is an aromatic heterocyclic ring, m is 0, 1, 2, 3, or 4.

Advantageous Effects of Invention

The agricultural or horticultural fungicide of the present invention has excellent fungicidal activity against many fungi that cause plant diseases, and can reduce the usage amount of each active ingredient.

DESCRIPTION OF EMBODIMENTS

A preferred embodiment for carrying out the present invention will now be explained.

The agricultural or horticultural fungicide according to the present embodiment includes a plurality of active ingredients, and specifically, includes a specific azole derivative as an active ingredient, and further includes another active ingredient. The inclusion of a plurality of active ingredients provides an effect that is superior to that predicted from the effects obtained when each active ingredient is used alone. First, the active ingredients will be described.

[1. Azole Derivative]

The azole derivative, which is one of the plurality of active ingredients contained in the agricultural or horticultural fungicide of the present embodiment, is represented by the following general formula (I) (hereinafter referred to as azole derivative (I)).

[Chem. 2]

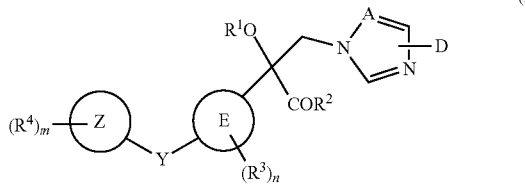

(I)

In the general formula (I), A is N or CH, preferably N. D is hydrogen, a halogen group, or $SR^D$, and $R^D$ is hydrogen, a cyano group, $C_1$-$C_6$-alkyl group, $C_1$-$C_6$-haloalkyl group, $C_2$-$C_6$-alkenyl group, $C_2$-$C_6$-haloalkenyl group, $C_2$-$C_6$-alkynyl group, or $C_2$-$C_6$-haloalkynyl group. D is preferably hydrogen.

The $C_1$-$C_6$-alkyl group is a linear or branched alkyl group with 1 to 6 carbon atoms, such as methyl, ethyl, n-propyl, isopropyl, 1-methylpropyl, 2-methylpropyl, 1-ethylpropyl, n-butyl, isobutyl, sec-butyl, tert-butyl, 2-methylbutyl, 3,3-dimethylbutyl, 2,2-dimethylbutyl, 1,1-dimethylbutyl, pentyl, 1-methylpentyl, neopentyl, and 1,1-dimethylethyl groups.

The $C_2$-$C_6$-alkenyl group is a linear or branched alkenyl group with 2 to 6 carbon atoms, such as ethenyl, 2-propenyl, 1-methyl-2-propenyl, 2-methyl-2-propenyl, 1-butenyl, 2-butenyl, 3-methyl-2-butenyl, 1-methyl-2-butenyl, 3-butenyl, 1-pentenyl, 2-pentenyl, 1-hexenyl, and 5-hexenyl groups.

The $C_2$-$C_6$-alkynyl group is a linear or branched alkynyl group with 2 to 6 carbon atoms, such as ethynyl, 1-propynyl, 2-propynyl, 1-butynyl, 2-butynyl, 3-butynyl, penthynyl, and 1-hexynyl groups.

The $C_1$-$C_6$-haloalkyl group, $C_2$-$C_6$-haloalkenyl group, or $C_2$-$C_6$-haloalkynyl group is the above-mentioned $C_1$-$C_6$-alkyl group, $C_2$-$C_6$-alkenyl group, or $C_2$-$C_6$-alkynyl group substituted with one or more halogen atoms at a substitutable position, and if there are two or more halogen substituents, the substituents may be the same or different. Examples of the halogen group include chlorine, bromine, iodine, and fluorine groups. Specific examples include chloromethyl, 2-chloroethyl, 2,3-dichloropropyl, bromomethyl, chlorodifluoromethyl, trifluoromethyl, and 3,3,3-trifluoropropyl groups.

$R^1$ is hydrogen, a $C_1$-$C_6$-alkyl group, $C_2$-$C_6$-alkenyl group, $C_2$-$C_6$-alkynyl group, $C_3$-$C_8$-cycloalkyl group, $C_3$-$C_8$-cycloalkyl-$C_1$-$C_4$-alkyl group, phenyl group, phenyl-$C_1$-$C_4$-alkyl group, phenyl-$C_2$-$C_4$-alkenyl group, phenyl-$C_2$-$C_4$-alkynyl group, or $COXR^5$. Examples of the $C_1$-$C_6$-alkyl group, $C_2$-$C_6$-alkenyl group, and $C_2$-$C_6$-alkynyl group in $R^1$ include the groups listed as examples of organic groups represented by $R^D$. $R^1$ is preferably hydrogen, a $C_1$-$C_6$-alkyl group, $C_2$-$C_6$-alkenyl group, $C_2$-$C_6$-alkynyl group, or $COXR^5$, and more preferably hydrogen, a $C_1$-$C_6$-alkyl group, or $COXR^5$, and most preferably hydrogen or a $C_1$-$C_6$-alkyl group.

The $C_3$-$C_8$-cycloalkyl group is a cyclic alkyl with 3 to 8 carbon atoms, such as cyclopropyl, cyclobutyl, cyclopentyl, cyclohexyl, cycloheptyl, and cyclooctyl groups.

The $C_3$-$C_8$-cycloalkyl-$C_1$-$C_4$-alkyl group represents that a cyclic cycloalkyl group with 3 to 8 carbon atoms is bonded to a linear or branched alkyl group with 1 to 4 carbon atoms. Specific examples thereof include cyclopropylmethyl, cyclobutylmethyl, cyclopentylmethyl, cyclohexylmethyl, 2-cyclopropylethyl, 1-cyclopropylethyl, 2-cyclohexylethyl, 3-cyclopropylpropyl, 2-cyclopropylpropyl, and 4-cyclopropybutyl groups.

The phenyl-$C_1$-$C_4$-alkyl group is a linear or branched alkyl group with 1 to 4 carbon atoms substituted with a phenyl group, and examples thereof include phenylmethyl, 2-phenylethyl, 3-phenylpropyl, and 4-phenylbutyl groups.

The phenyl-$C_2$-$C_4$-alkenyl group has a linear or branched alkenyl group with 2 to 4 carbon atoms bonded to a phenyl group, and examples thereof include phenylethenyl, phenyl-1-propenyl, phenylisopropenyl, and phenylbutenyl groups.

The phenyl-$C_2$-$C_4$-alkynyl group has an alkynyl group with 2 to 4 carbon atoms bonded to a phenyl group, and examples thereof include phenylethynyl, phenyl-1-propynyl, phenyl-2-propynyl, phenyl-1-butynyl, phenyl-2-butynyl, phenyl-3-butynyl, and phenyl-3-butynyl groups.

$R^5$ is hydrogen, a $C_1$-$C_6$-alkyl group, $C_2$-$C_6$-alkenyl group, $C_2$-$C_6$-alkynyl group, $C_3$-$C_8$-cycloalkyl group, $C_3$-$C_8$-cycloalkyl-$C_1$-$C_4$-alkyl group, phenyl group, phenyl- $C_1$-$C_4$-alkyl group, phenyl-$C_2$-$C_4$-alkenyl group, or phenyl-$C_2$-$C_4$-alkynyl group. Examples thereof include the groups listed as examples of organic groups represented by $R^D$ and $R^1$. $R^5$ is preferably hydrogen, a $C_1$-$C_6$-alkyl group, $C_2$-$C_6$-alkenyl group, or $C_2$-$C_6$-alkynyl group, and more preferably hydrogen or a $C_1$-$C_6$-alkyl group.

X is a single bond, —O—, or —$NR^6$—, and $R^6$ is hydrogen, a $C_1$-$C_6$-alkyl group, $C_2$-$C_6$-alkenyl group, $C_2$-$C_6$-alkynyl group, $C_3$-$C_8$-cycloalkyl group, $C_3$-$C_8$-cycloalkyl-$C_1$-$C_4$-alkyl group, phenyl group, phenyl-$C_1$-$C_4$-alkyl group, phenyl-$C_2$-$C_4$-alkenyl group, or phenyl-$C_2$-$C_4$-alkynyl group, and examples thereof include the groups listed as examples of the organic groups represented by $R^D$ and $R^1$. $R^6$ is preferably hydrogen, a $C_1$-$C_6$-alkyl group, $C_2$-$C_6$-alkenyl group, or $C_2$-$C_6$-alkynyl group, and more preferably hydrogen. $R^5$ and $R^6$ may form a ring.

$R^2$ is —$OR^7$ or —$NR^8R^9$, preferably —$OR^7$. $R^7$, $R^8$, and $R^9$ are each independently hydrogen, a $C_1$-$C_6$-alkyl group, $C_2$-$C_6$-alkenyl group, $C_2$-$C_6$-alkynyl group, $C_3$-$C_8$-cycloalkyl group, $C_3$-$C_8$-cycloalkyl-$C_1$-$C_4$-alkyl group, phenyl group, phenyl-$C_1$-$C_4$-alkyl group, phenyl-$C_2$-$C_4$-alkyl group, or phenyl-$C_2$-$C_4$-alkynyl group, and examples thereof include the groups listed as examples of organic groups represented by $R^D$ and $R^1$. $R^8$ and $R^9$ may form a ring.

$R^7$ is preferably a $C_1$-$C_6$-alkyl group.

The aliphatic groups in $R^1$, $R^2$, $R^5$, $R^6$, $R^7$, $R^8$, and $R^9$ may have 1, 2, 3 or a maximum possible number of the same or different groups $R^a$s, where the $R^a$s are each independently selected from halogen, cyano group, nitro group, $C_1$-$C_4$-alkoxy, and $C_1$-$C_4$-haloalkoxy groups. The $C_1$-$C_4$-alkoxy group is a linear or branched alkoxy group with 1 to 4 carbon atoms, such as methoxy, ethoxy, n-propoxy, isopropoxy, n-butoxy, sec-butoxy, and tert-butoxy groups.

The $C_1$-$C_4$-alkoxy group may be substituted with 1 or more halogen groups at substitutable positions, and if there are 2 or more halogen substituents, they may be the same or different.

E is a phenyl group or a 6-membered aromatic heterocyclic ring containing 1 or 2 N atoms. E is preferably a phenyl group. The preferred form in which E is a phenyl group is as shown in the following general formula (I').

[Chem. 3]

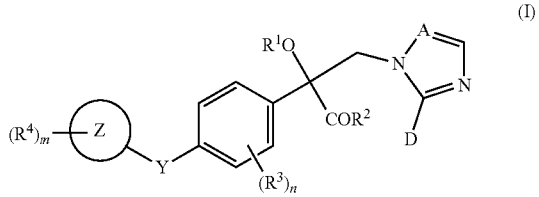

(I)

$R^3$ is a halogen group, cyano group, nitro group, phenyl group, phenyl-oxy group, $C_1$-$C_4$-alkyl group, $C_1$-$C_4$-haloalkyl group, $C_1$-$C_4$-alkoxy group, $C_1$-$C_4$-haloalkoxy group, —$SOR^{10}$, or —$SF_5$. Examples of the halogen group, $C_1$-$C_4$-alkyl group, $C_1$-$C_4$-haloalkyl group, $C_1$-$C_4$-alkoxy group, and $C_1$-$C_4$-haloalkoxy groups include the groups listed as examples of organic groups represented by $R^D$, $R^1$, or $R^a$. $R^3$ is preferably a halogen group, cyano group, $C_1$-$C_4$-alkyl group, $C_1$-$C_4$ haloalkyl group, $C_1$-$C_4$-alkoxy group, —$SOR^{10}$, or —$SF_5$, and more preferably a halogen group, cyano group, $C_1$-$C_4$-alkyl group, $C_1$-$C_4$-haloalkyl group, or $C_1$-$C_4$-alkoxy group. $R^{10}$ is a $C_1$-$C_4$-alkyl group, or $C_1$-$C_4$-haloalkyl group. When E is a phenyl group, the substitution position of $R^3$ is at the 2-, 3-, 5-, or 6-position, and preferably 2-position. The n is 0, 1, 2 or, 3, preferably 1. When E is a 6-membered aromatic heterocyclic ring containing 1 or 2 N atoms, the substitution position of $R^3$ does not contain an N atom among the 2-, 3-, 5-, and 6-positions, and is preferably the 2-position. In this case, n is 0, 1, or 2, preferably 1.

$R^4$ is a halogen group, cyano group, nitro group, amino group, phenyl group, phenyl-oxy group, $C_1$-$C_4$-alkyl group, $C_1$-$C_4$-haloalkyl group, $C_1$-$C_4$-alkoxy group, or $C_1$-$C_4$-alkoxy group, $C_1$-$C_4$-alkylamino group, $C_1$-$C_4$-dialkylamino group, $C_1$-$C_4$-alkyl acylamino group, —$SOR^{10}$, or —$SF_5$, and examples of the halogen group, $C_1$-$C_4$-alkyl group, $C_1$-$C_4$-haloalkyl group, $C_1$-$C_4$-alkoxy group, $C_1$-$C_4$-haloalkoxy group, and —$SOR^{10}$ include the groups listed as examples of organic groups represented by $R^D$, $R^1$, and $R^3$. $R^4$ is preferably a halogen group, nitro group, amino group, $C_1$-$C_4$-alkyl group, $C_1$-$C_4$-haloalkyl group, $C_1$-$C_4$-alkoxy group, $C_1$-$C_4$-haloalkoxy group, $C_1$-$C_4$-alkylamino group, $C_1$-$C_4$-dialkylamino group, $C_1$-$C_4$-alkyl acylamino group, —$SOR^{10}$, or —$SF_5$, and more preferably a halogen group, $C_1$-$C_4$-alkyl group, $C_1$-$C_4$-haloalkyl group, $C_1$-$C_4$-alkoxy group, or $C_1$-$C_4$-haloalkoxy group.

The $C_1$-$C_4$-alkylamino group is an amino group in which one of the hydrogen atoms of the amino group is substituted with a linear or branched alkyl group with 1 to 4 carbon atoms, and examples thereof include methylamino, ethylamino, n-propylamino, isopropylamino, and tert-butylamino groups.

The $C_1$-$C_4$-dialkylamino group is an amino group in which both of the two hydrogen atoms of the amino group are substituted with a linear or branched alkyl group with 1 to 4 carbon atoms, and examples thereof include N,N-dimethylamino, N,N-diethylamino, N,N-di-n-propylamino, N,N-diisopropylamino, and N,N-di-tert-butylamino groups.

The $C_1$-$C_4$-alkylacylamino group is an amino group in which 1 or 2 of the hydrogen atoms of the amino group are substituted with a linear or branched alkylacyl group with 1 to 4 carbon atoms, and examples thereof include methylacylamino, ethylacylamino, n-propylacylamino, isopropylacylamino, tert-butylacylamino, N,N-dimethylacylamino, N,N-diethylacylamino, N,N-di-n-propylacylamino, N,N-diisopropylacylamino, and N,N-di-tert-butylacylamino groups.

The cycloalkyl or phenyl group moieties in $R^1$, $R^2$, $R^5$, $R^6$, $R^7$, $R^8$, and $R^9$, or the phenyl group moiety in $R^3$ or $R^4$ may have 1, 2, 3, 4, 5, or a maximum possible number of the same or different groups $R^b$s. The $R^b$s are each independently selected from a halogen group, cyano group, nitro group, $C_1$-$C_4$-alkyl group, $C_1$-$C_4$-alkoxy group, $C_1$-$C_4$-haloalkyl group, and $C_1$-$C_4$-haloalkoxy group. Examples of the halogen group, $C_1$-$C_4$-alkyl group, $C_1$-$C_4$-alkoxy group, $C_1$-$C_4$-haloalkyl group, and $C_1$-$C_4$-haloalkoxy group include the groups listed as examples of organic groups represented by $R^D$, $R^1$ or $R^a$.

Y is an oxygen atom, —$CH_2O$—, —$OCH_2$—, —NH—, —N(—$C_1$-$C_4$-alkyl)-, —N(—$C_3$-$C_6$-cycloalkyl)-, or —$S(O)_p$—, where p is 0, 1, or 2, bonded to any position of the phenyl group to which $(R^3)_n$ is bonded, and preferably an oxygen atom.

Y is bonded to the ortho-, meta-, or para-position, preferably meta- or para-position of the phenyl group substituted with $R^3$.

Z is an aromatic hydrocarbon group that is a phenyl or naphthyl group, or a 5- or 6-membered aromatic heterocyclic group containing from 1 to 4 heteroatoms selected from O, N, or S, or a 9- or 10-membered aromatic heterocyclic group consisting of two rings. Z is preferably a phenyl group or a 5- or 6-membered aromatic heterocyclic ring containing from 1 to 3 heteroatoms selected from N and S, and more preferably a phenyl group.

Examples of the 5- or 6-membered aromatic heterocyclic group include furyl, pyrazolyl, thienyl, pyridyl, pyrimidinyl, pyridazinyl, pyrazinyl, pyrrolyl, imidazolyl, pyrazolyl, thiazolyl, isothiazolyl, oxazolyl, isoxazolyl, oxadiazolyl, thiadiazolyl, triazolyl, tetrazolyl, and triazinyl groups.

Examples of the 9- or 10-membered aromatic heterocyclic groups consisting of 2 rings include indolyl, isoindolyl, benzimidazolyl, quinolinyl, isoquinolinyl, quinoxalinyl, cinnolyl, benzopyranyl, and pteridinyl groups.

The m $R^4$s are bonded o any substitution position, preferably in the 2-, 3-, 4- or 5-position. When Z is an aromatic hydrocarbon group, m is 1, 2, 3, 4, or 5, and when Z is an aromatic heterocyclic ring, m is 0, 1, 2, 3, or 4.

Particularly preferable examples of the azole derivative (I) are listed in Table 1 below. $R^1$, $R^2$, $R^3$, $R^4$, and Y in Table 1 below correspond to $R^1$, $R^2$, $R^3$, $R^4$, and Y in Chemical Formula (Ia) below, respectively. Each of the specific azole derivatives indicated by each compound number may be referred to as "azole derivative N" (N is the compound number) in the following.

[Chem. 4]

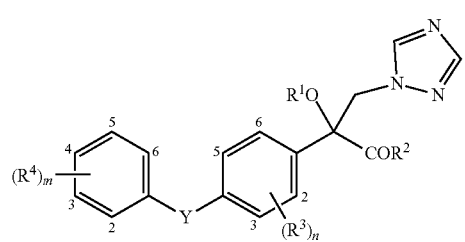

Ia

TABLE 1

| Compound No. | $R^1$ | $R^2$ | $(R^3)_n$ | $(R^4)_m$ | Y |
|---|---|---|---|---|---|
| I-1 | H | OMe | 2-Cl | 4-Cl | —O— |
| I-2 | H | OMe | 2-Me | 4-Cl | —O— |
| I-3 | H | OMe | 2-MeO | 4-Cl | —O— |
| I-4 | H | OMe | 2-CN | 4-Cl | —O— |
| I-5 | H | OMe | H | 4-Cl | —O— |
| I-6 | H | OMe | 3-Cl | 4-Cl | —O— |
| I-7 | H | OMe | 2-OCF$_3$ | 4-Cl | —O— |
| I-8 | H | OMe | 2-SF$_5$ | 4-Cl | —O— |
| I-9 | H | OMe | 3-CF$_3$ | 4-Cl | —O— |
| I-10 | H | OMe | 3-F | 4-Cl | —O— |
| I-11 | H | OMe | 3-Br | 4-Cl | —O— |
| I-12 | H | OMe | 2, 3-Cl$_2$ | 4-Cl | —O— |
| I-13 | H | OMe | 2, 3-F$_2$ | 4-Cl | —O— |
| I-14 | H | OMe | 2, 5-Cl$_2$ | 4-Cl | —O— |
| I-15 | H | OMe | 2, 5-F$_2$ | 4-Cl | —O— |
| I-16 | H | OMe | 2, 6-Cl$_2$ | 4-Cl | —O— |
| I-17 | H | OMe | 2, 6-F$_2$ | 4-Cl | —O— |
| I-18 | H | OMe | 2-Cl | 4-MeO | —O— |
| I-19 | H | OMe | 2-Cl | 2-Cl | —O— |
| I-20 | H | OMe | 2-Cl | 3-Cl | —O— |
| I-21 | H | OMe | 2-Cl | 2, 4-Cl$_2$ | —O— |
| I-22 | H | OMe | 2-Cl | 4-OCF$_3$ | —O— |
| I-23 | H | OMe | 2-Cl | 4-CF$_3$ | —O— |
| I-24 | H | OMe | 2-Cl | 4-tBu | —O— |
| I-25 | H | OMe | 2-Cl | 4-Br | —O— |
| I-26 | H | OMe | 2-Cl | 4-F | —O— |
| I-27 | H | OMe | 2-Cl | 3, 4-Cl$_3$ | —O— |
| I-28 | H | OMe | 2-Cl | 3.4-F$_2$ | —O— |
| I-29 | H | OMe | 2-Cl | 3-F, 4-Cl | —O— |
| I-30 | H | OMe | 2-Cl | 3-Cl, 4-F | —O— |
| I-31 | H | OMe | 2-Cl | 2, 4-F$_2$ | —O— |
| I-32 | H | OMe | 2-Cl | 2-F, 4-Cl | —O— |
| I-33 | H | OMe | 2-Cl | 4-SF$_5$5 | —O— |
| I-34 | H | OMe | 2-Cl | 4-ME | —O— |
| I-35 | H | OMe | 2-Cl | 4-CN | —O— |
| I-36 | H | OMe | 2-Cl | 3, 4, 5-Cl$_3$ | —O— |
| I-37 | H | OMe | 2-Cl | 3, 4, 5-F$_3$ | —O— |
| I-38 | H | OMe | 2-Cl | 2, 4, 6-Cl$_3$ | —O— |
| I-39 | H | OMe | 2-Cl | 2, 4, 6-F$_3$ | —O— |
| I-40 | H | OMe | 2-Cl | 3-F, 4-Br | —O— |
| I-41 | H | OMe | 2-Cl | 3-Br, 4-F | —O— |
| I-42 | H | OMe | 2-Cl | 2, 4-Br$_2$ | —O— |
| I-43 | H | OMe | 2-Cl | 2-F, 4-Br | —O— |
| I-44 | H | OMe | 2-Cl | 3-Cl, 4-Br | —O— |
| I-45 | H | OMe | 2-Cl | 3-Br, 4-Cl | —O— |
| I-46 | H | OEt | 2-Cl | 4-Cl | —O— |
| I-47 | H | O—iPr | 2-Cl | 4-Cl | —O— |
| I-48 | H | OCH$_2$(C$_3$H$_5$) | 2-Cl | 4-Cl | —O— |
| I-49 | H | O—nPr | 2-Cl | 4-Cl | —O— |
| I-50 | H | O—nBu | 2-Cl | 4-Cl | —O— |
| I-51 | H | O—iBu | 2-Cl | 4-Cl | —O— |
| I-52 | H | O—tBu | 2-Cl | 4-Cl | —O— |
| I-53 | H | O—C$_5$H$_{12}$ | 2-Cl | 4-Cl | —O— |
| I-54 | H | NHMe | 2-Cl | 4-Cl | —O— |
| I-55 | H | NMe$_2$ | 2-Cl | 4-Cl | —O— |
| I-56 | H | NHEt | 2-Cl | 4-Cl | —O— |
| I-57 | H | NEt$_2$ | 2-Cl | 4-Cl | —O— |
| I-58 | H | NH-nPr | 2-Cl | 4-Cl | —O— |
| I-59 | H | N(nPr)$_2$ | 2-Cl | 4-Cl | —O— |
| I-60 | H | Morphorino- | 2-Cl | 4-Cl | —O— |
| I-61 | H | Piperidino- | 2-Cl | 4-Cl | —O— |
| I-62 | H | Pyrrolidino- | 2-Cl | 4-Cl | —O— |
| I-63 | Me | OMe | 2-Cl | 4-Cl | —O— |
| I-64 | MeCO— | OMe | 2-Cl | 4-Cl | —O— |
| I-65 | tBuCO— | OMe | 2-Cl | 4-Cl | —O— |
| I-66 | PhCO— | OMe | 2-Cl | 4-Cl | —O— |
| I-67 | C$_3$H$_5$CO— | OMe | 2-Cl | 4-Cl | —O— |
| I-68 | Me$_2$NCO— | OMe | 2-Cl | 4-Cl | —O— |
| I-69 | Me$_2$NCO— | OMe | 2-Cl | 4-Cl | —O— |
| I-70 | H | OMe | 2-Cl | 4-Cl | —S— |
| I-71 | H | OMe | 2-Cl | 4-Cl | —S(O)— |
| I-72 | H | OMe | 2-Cl | 4-Cl | —S(O)$_2$— |
| I-73 | H | OMe | 2-Cl | 4-Cl | —NH— |
| I-74 | H | OMe | 2-Cl | 4-Cl | —NMe— |
| I-75 | H | OMe | 2-Cl | 4-Cl | —N(CH$_2$Ph)— |
| I-76 | H | OMe | 2-Cl | 4-Cl | —CH$_2$O— |
| I-77 | H | OMe | 2-Cl | 4-Cl | —OCH$_2$— |
| I-78 | H | OEt | 2-Cl | 4-Br | —O— |
| I-79 | H | O—iPr | 2-Cl | 4-Br | —O— |
| I-80 | H | OCH$_2$(C$_3$H$_5$) | 2-Cl | 4-Br | —O— |
| I-81 | H | O—nPr | 2-Cl | 4-Br | —O— |
| I-82 | H | O—nBu | 2-Cl | 4-Br | —O— |
| I-83 | H | O—tBu | 2-Cl | 4-Br | —O— |
| I-84 | H | NMe$_2$ | 2-Cl | 4-Br | —O— |
| I-85 | H | NEt$_2$ | 2-Cl | 4-Br | —O— |
| I-86 | H | Morphorino- | 2-Cl | 4-Br | —O— |
| I-87 | H | Piperidino- | 2-Cl | 4-Br | —O— |
| I-88 | Me | OMe | 2-Cl | 4-Br | —O— |
| I-89 | MeCO— | OMe | 2-Cl | 4-Br | —O— |
| I-90 | Me$_2$NCO— | OMe | 2-Cl | 4-Br | —O— |
| I-91 | H | OMe | 2-Cl | 4-Br | —CH$_2$O— |
| I-92 | H | OMe | 2-Cl | 4-Br | —OCH$_2$— |
| I-93 | H | OEt | 2-Cl | 4-CF$_3$ | —O— |
| I-94 | H | O—iPr | 2-Cl | 4-CF$_3$ | —O— |
| I-95 | H | OCH$_2$(C$_3$H$_5$) | 2-Cl | 4-CF$_3$ | —O— |
| I-96 | H | O—nPr | 2-Cl | 4-CF$_3$ | —O— |
| I-97 | H | O—nBu | 2-Cl | 4-CF$_3$ | —O— |
| I-98 | Me | O—tBu | 2-Cl | 4-CF$_3$ | —O— |
| I-99 | MeCO— | NMe$_2$ | 2-Cl | 4-CF$_3$ | —O— |
| I-100 | tBuCO— | NEt$_2$ | 2-Cl | 4-CF$_3$ | —O— |
| I-101 | PhCO— | Morphorino- | 2-Cl | 4-CF$_3$ | —O— |

TABLE 1-continued

| Compound No. | R¹ | R² | (R³)ₙ | (R⁴)ₘ | Y |
|---|---|---|---|---|---|
| I-102 | C₃H₅CO— | Piperidino- | 2-Cl | 4-CF₃ | —O— |
| I-103 | Me | OMe | 2-Cl | 4-CF₃ | —O— |
| I-104 | MeCO— | OMe | 2-Cl | 4-CF₃ | —O— |
| I-105 | Me₂NCO— | OMe | 2-Cl | 4-CF₃ | —O— |
| I-106 | H | OMe | 2-Cl | 4-CF₃ | —CH₂O— |
| I-107 | H | OMe | 2-Cl | 4-CF₃ | —OCH₂— |
| I-108 | H | OEt | 2-Cl | 4-OCF₃ | —NH— |
| I-109 | H | O—iPr | 2-Cl | 4-OCF₃ | —NMe— |
| I-110 | H | OCH₂(C₃H₅) | 2-Cl | 4-OCF₃ | —N(CH₂Ph)— |
| I-111 | H | O—nPr | 2-Cl | 4-OCF₃ | —CH₂O— |
| I-112 | H | O—nBu | 2-Cl | 4-OCF₃ | —OCH₂— |
| I-113 | H | O—tBu | 2-Cl | 4-OCF₃ | —O— |
| I-114 | H | NMe₂ | 2-Cl | 4-OCF₃ | —O— |
| I-115 | H | NEt₂ | 2-Cl | 4-OCF₃ | —O— |
| I-116 | H | Morphorino- | 2-Cl | 4-OCF₃ | —O— |
| I-117 | H | Piperidino- | 2-Cl | 4-OCF₃ | —O— |
| I-118 | Me | OMe | 2-Cl | 4-OCF₃ | —O— |
| I-119 | MeCO— | OMe | 2-Cl | 4-OCF₃ | —O— |
| I-120 | Me₂NCO— | OMe | 2-Cl | 4-OCF₃ | —O— |
| I-121 | H | OMe | 2-Cl | 4-OCF₃ | —CH₂O— |
| I-122a | H | OMe | 2-Cl | 4-OCF₃ | —OCH₂— |
| I-122 | H | OMe | 2-CF₃ | 4-Cl | —O— |
| I-123 | Me | OMe | 2-CF₃ | 4-MeO | —O— |
| I-124 | MeCO— | OMe | 2-CF₃ | 2-Cl | —O— |
| I-125 | Me₂NCO— | OMe | 2-CF₃ | 3-Cl | —O— |
| I-126 | H | OMe | 2-CF₃ | 2, 4-Cl₂ | —O— |
| I-127 | H | OMe | 2-CF₃ | 4-OCF₃ | —O— |
| I-128 | H | OMe | 2-CF₃ | 4-CF₃ | —O— |
| I-129 | H | OMe | 2-CF₃ | 4-tBu | —O— |
| I-130 | H | OMe | 2-CF₃ | 4-Br | —O— |
| I-131 | H | OMe | 2-CF₃ | 4-F | —O— |
| I-132 | H | OMe | 2-CF₃ | 3, 4-Cl₂ | —O— |
| I-133 | Me | OMe | 2-CF₃ | 3, 4-F₂ | —O— |
| I-134 | MeCO— | OMe | 2-CF₃ | 3-F, 4-Cl | —O— |
| I-135 | tBuCO— | OMe | 2-CF₃ | 3-Cl, 4-F | —O— |
| I-136 | PhCO— | OMe | 2-CF₃ | 2, 4-F₂ | —O— |
| I-137 | H | OMe | 2-CF₃ | 2-F, 4-Cl | —O— |
| I-138 | H | OMe | 2-CF₃ | 4-SF₅ | —O— |
| I-139 | H | OMe | 2-CF₃ | 4-Me | —O— |
| I-140 | H | OMe | 2-CF₃ | 4-CN | —O— |
| I-141 | H | OMe | 2-CF₃ | 3, 4, 5-Cl₃ | —O— |
| I-142 | H | OMe | 2-CF₃ | 3, 4, 5-F₃ | —O— |
| I-143 | H | OMe | 2-CF₃ | 2, 4, 6-Cl₃ | —O— |
| I-144 | H | OMe | 2-CF₃ | 2, 4, 6-F₃ | —O— |
| I-145 | H | OMe | 2-CF₃ | 3-F, 4-Br | —O— |
| I-146 | H | OMe | 2-CF₃ | 3-Br, 4-F | —O— |
| I-147 | H | OMe | 2-CF₃ | 2, 4-Br₂ | —O— |
| I-148 | H | OMe | 2-CF₃ | 2-F, 4-Br | —O— |
| I-149 | H | OMe | 2-CF₃ | 3-Cl, 4-Br | —O— |
| I-150 | H | OMe | 2-CF₃ | 3-Br, 4-Cl | —O— |
| I-151 | H | OEt | 2-CF₃ | 4-Cl | —O— |
| I-152 | H | O—iPr | 2-CF₃ | 4-Cl | —O— |
| I-153 | H | OCH₂(C₃H₅) | 2-CF₃ | 4-Cl | —O— |
| I-154 | H | O—nPr | 2-CF₃ | 4-Cl | —O— |
| I-155 | H | O—nBu | 2-CF₃ | 4-Cl | —O— |
| I-156 | H | O—iBu | 2-CF₃ | 4-Cl | —O— |
| I-157 | H | O—tBu | 2-CF₃ | 4-Cl | —O— |
| I-158 | H | O—C₅H₁₂ | 2-CF₃ | 4-Cl | —O— |
| I-159 | H | NHMe | 2-CF₃ | 4-Cl | —O— |
| I-160 | H | NMe₂ | 2-CF₃ | 4-Cl | —O— |
| I-161 | H | NHEt | 2-CF₃ | 4-Cl | —O— |
| I-162 | H | NEt₂ | 2-CF₃ | 4-Cl | —O— |
| I-163 | H | NH-nPr | 2-CF₃ | 4-Cl | —O— |
| I-164 | H | N(nPr)₂ | 2-CF₃ | 4-Cl | —O— |
| I-165 | H | Morphorino- | 2-CF₃ | 4-Cl | —O— |
| I-166 | H | Piperidino- | 2-CF₃ | 4-Cl | —O— |
| I-167 | H | Pyrrolidino- | 2-CF₃ | 4-Cl | —O— |
| I-168 | Me | OMe | 2-CF₃ | 4-Cl | —O— |
| I-169 | MeCO— | OMe | 2-CF₃ | 4-Cl | —O— |
| I-170 | tBuCO— | OMe | 2-CF₃ | 4-Cl | —O— |
| I-171 | PhCO— | OMe | 2-CF₃ | 4-Cl | —O— |
| I-172 | C₃H₅CO— | OMe | 2-CF₃ | 4-Cl | —O— |
| I-173 | Me₂NCO— | OMe | 2-CF₃ | 4-Cl | —O— |
| I-174 | H | OMe | 2-CF₃ | 4-Cl | —O— |
| I-175 | H | OMe | 2-CF₃ | 4-Cl | —S— |
| I-176 | H | OMe | 2-CF₃ | 4-Cl | —S(O)— |
| I-177 | H | OMe | 2-CF₃ | 4-Cl | —S(O)₂— |
| I-178 | H | OMe | 2-CF₃ | 4-Cl | NH— |
| I-179 | H | OMe | 2-CF₃ | 4-Cl | —NMe— |
| I-180 | H | OMe | 2-CF₃ | 4-Cl | —N(CH₂Ph)— |
| I-181 | H | OMe | 2-CF₃ | 4-Cl | —CH₂O— |
| I-182 | H | OMe | 2-CF₃ | 4-Cl | —OCH₂— |
| I-183 | H | OEt | 2-CF₃ | 4-Br | —O— |
| I-184 | H | O—iPr | 2-CF₃ | 4-Br | —O— |
| I-185 | H | OCH₂(C₃H₅) | 2-CF₃ | 4-Br | —O— |
| I-186 | H | O—nPr | 2-CF₃ | 4-Br | —O— |
| I-187 | H | O—nBu | 2-CF₃ | 4-Br | —O— |
| I-188 | H | O—tBu | 2-CF₃ | 4-Br | —O— |
| I-189 | H | NMe₂ | 2-CF₃ | 4-Br | —O— |
| I-190 | H | NEt₂ | 2-CF₃ | 4-Br | —O— |
| I-191 | H | Morphorino- | 2-CF₃ | 4-Br | —O— |
| I-192 | H | Piperidino- | 2-CF₃ | 4-Br | —O— |
| I-193 | H | OMe | 2-CF₃ | 4-Br | —O— |
| I-194 | MeCO— | OMe | 2-CF₃ | 4-Br | —O— |
| I-195 | Me₂NCO— | OMe | 2-CF₃ | 4-Br | —O— |
| I-196 | H | OMe | 2-CF₃ | 4-Br | —CH₂O— |
| I-197 | H | OMe | 2-CF₃ | 4-Br | —OCH₂— |
| I-198 | H | OEt | 2-CF₃ | 4-CF₃ | —O— |
| I-199 | H | O—iPr | 2-CF₃ | 4-CF₃ | —O— |
| I-200 | H | OCH₂(C₃H₅) | 2-CF₃ | 4-CF₃ | —O— |
| I-201 | H | O—nPr | 2-CF₃ | 4-CF₃ | —O— |
| I-202 | H | O—nBu | 2-CF₃ | 4-CF₃ | —O— |
| I-203 | H | O—tBu | 2-CF₃ | 4-CF₃ | —O— |
| I-204 | H | NMe₂ | 2-CF₃ | 4-CF₃ | —O— |
| I-205 | H | NEt₂ | 2-CF₃ | 4-CF₃ | —O— |
| I-206 | H | Morphorino- | 2-CF₃ | 4-CF₃ | —O— |
| I-207 | Me | Piperidino- | 2-CF₃ | 4-CF₃ | —O— |
| I-208 | Me | OMe | 2-CF₃ | 4-CF₃ | —O— |
| I-209 | Me₂NCO— | OMe | 2-CF₃ | 4-CF₃ | —O— |
| I-210 | H | OMe | 2-CF₃ | 4-CF₃ | —O— |
| I-211 | H | OMe | 2-CF₃ | 4-CF₃ | —CH₂O— |
| I-212 | H | OMe | 2-CF₃ | 4-CF₃ | —OCH₂— |
| I-213 | H | OEt | 2-CF₃ | 4-OCF₃ | —O— |
| I-214 | H | O—iPr | 2-CF₃ | 4-OCF₃ | —O— |
| I-215 | H | OCH₂(C₃H₅) | 2-CF₃ | 4-OCF₃ | —O— |
| I-216 | H | O—nPr | 2-CF₃ | 4-OCF₃ | —O— |
| I-217 | H | O—nBu | 2-CF₃ | 4-OCF₃ | —O— |
| I-218 | H | O—tBu | 2-CF₃ | 4-OCF₃ | —O— |
| I-219 | H | NMe₂ | 2-CF₃ | 4-OCF₃ | —O— |
| I-220 | H | NEt₂ | 2-CF₃ | 4-OCF₃ | —O— |
| I-221 | H | Morphorino- | 2-CF₃ | 4-OCF₃ | —O— |
| I-222 | H | Piperidino- | 2-CF₃ | 4-OCF₃ | —O— |
| I-223 | Me | OMe | 2-CF₃ | 4-OCF₃ | —O— |
| I-224 | MeCO— | OMe | 2-CF₃ | 4-OCF₃ | —O— |
| I-225 | Me₂NCO— | OMe | 2-CF₃ | 4-OCF₃ | —O— |
| I-226 | H | OMe | 2-CF₃ | 4-OCF₃ | —CH₂O— |
| I-227 | H | OMe | 2-CF₃ | 4-OCF₃ | —OCH₂— |
| I-228 | H | OMe | 2-Br | 4-Cl | —O— |
| I-229 | H | OMe | 2-Br | 4-MeO | —O— |
| I-230 | H | OMe | 2-Br | 2-Cl | —O— |
| I-231 | H | OMe | 2-Br | 3-Cl | —O— |
| I-232 | H | OMe | 2-Br | 2, 4-Cl₂ | —O— |
| I-233 | H | OMe | 2-Br | 4-OCF₃ | —O— |
| I-234 | H | OMe | 2-Br | 4-CF₃ | —O— |
| I-235 | H | OMe | 2-Br | 4-tBu | —O— |
| I-236 | H | OMe | 2-Br | 4-Br | —O— |
| I-237 | H | OMe | 2-Br | 4-F | —O— |
| I-238 | H | OMe | 2-Br | 3, 4-Cl₂ | —O— |
| I-239 | H | OMe | 2-Br | 3, 4-F₂ | —O— |
| I-240 | H | OMe | 2-Br | 3-F, 4-Cl | —O— |
| I-241 | H | OMe | 2-Br | 3-Cl, 4-F | —O— |
| I-242 | H | OMe | 2-Br | 2, 4-F₂ | —O— |
| I-243 | H | OMe | 2-Br | 2-F, 4-Cl | —O— |
| I-244 | H | OMe | 2-Br | 4-SF₅ | —O— |
| I-245 | H | OMe | 2-Br | 4-Me | —O— |
| I-246 | H | OMe | 2-Br | 4-CN | —O— |
| I-248 | H | OMe | 2-Br | 3, 4, 5-F₃ | —O— |
| I-249 | H | OMe | 2-Br | 2, 4, 6-Cl₃ | —O— |
| I-250 | H | OMe | 2-Br | 2, 4, 6-F₃ | —O— |
| I-251 | H | OMe | 2-Br | 3-F, 4-Br | —O— |
| I-252 | H | OMe | 2-Br | 3-Br, 4-F | —O— |
| I-253 | H | OMe | 2-Br | 2, 4-Br₂ | —O— |

TABLE 1-continued

| Compound No. | R¹ | R² | (R³)ₙ | (R⁴)ₘ | Y |
|---|---|---|---|---|---|
| I-254 | H | OMe | 2-Br | 2-F, 4-Br | —O— |
| I-255 | H | OMe | 2-Br | 3-Cl, 4-Br | —O— |
| I-256 | H | OMe | 2-Br | 3-Br, 4-Cl | —O— |
| I-257 | H | OEt | 2-Br | 4-Cl | —O— |
| I-258 | H | O—iPr | 2-Br | 4-Cl | —O— |
| I-259 | H | OCH₂(C₃H₅) | 2-Br | 4-Cl | —O— |
| I-260 | H | O—nPr | 2-Br | 4-Cl | —O— |
| I-261 | H | O—nBu | 2-Br | 4-Cl | —O— |
| I-262 | H | O—iBu | 2-Br | 4-Cl | —O— |
| I-263 | H | O—tBu | 2-Br | 4-Cl | —O— |
| I-264 | H | O—C₅H₁₂ | 2-Br | 4-Cl | —O— |
| I-265 | H | NHMe | 2-Br | 4-Cl | —O— |
| I-266 | H | NMe₂ | 2-Br | 4-Cl | —O— |
| I-267 | H | NHEt | 2-Br | 4-Cl | —O— |
| I-268 | H | NEt₂ | 2-Br | 4-Cl | —O— |
| I-269 | H | NH-nPr | 2-Br | 4-Cl | —O— |
| I-270 | H | N(nPr)₂ | 2-Br | 4-Cl | —O— |
| I-271 | H | Morphorino- | 2-Br | 4-Cl | —O— |
| I-272 | H | Piperidino- | 2-Br | 4-Cl | —O— |
| I-273 | H | Pyrrolidino- | 2-Br | 4-Cl | —O— |
| I-274 | Me | OCH₃ | 2-Br | 4-Cl | —O— |
| I-275 | MeCO— | OCH₃ | 2-Br | 4-Cl | —O— |
| I-276 | tBuCO— | OCH₃ | 2-Br | 4-Cl | —O— |
| I-277 | PhCO— | OCH₃ | 2-Br | 4-Cl | —O— |
| I-278 | MeOCO— | OCH₃ | 2-Br | 4-Cl | —O— |
| I-279 | Me₂NCO— | OCH₃ | 2-Br | 4-Cl | —O— |
| I-281 | H | OMe | 2-Br | 4-Cl | —S— |
| I-282 | H | OMe | 2-Br | 4-Cl | —S(O)— |
| I-283 | H | OMe | 2-Br | 4-Cl | —S(O)₂— |
| I-284 | H | OMe | 2-Br | 4-Cl | —NH— |
| I-285 | H | OMe | 2-Br | 4-Cl | —NMe— |
| I-286 | H | OMe | 2-Br | 4-Cl | —N(CH₂Ph)— |
| I-287 | H | OMe | 2-Br | 4-Cl | —CH₂O— |
| I-288 | H | OMe | 2-Br | 4-Cl | —OCH₂— |
| I-289 | H | OEt | 2-Br | 4-Br | —O— |
| I-290 | H | O—iPr | 2-Br | 4-Br | —O— |
| I-291 | H | OCH₂(C₃H₅) | 2-Br | 4-Br | —O— |
| I-292 | H | O—nPr | 2-Br | 4-Br | —O— |
| I-293 | H | O—nBu | 2-Br | 4-Br | —O— |
| I-294 | H | O—tBu | 2-Br | 4-Br | —O— |
| I-295 | H | NMe₂ | 2-Br | 4-Br | —O— |
| I-296 | H | NEt₂ | 2-Br | 4-Br | —O— |
| I-297 | H | Morphino- | 2-Br | 4-Br | —O— |
| I-298 | H | Piperidino- | 2-Br | 4-Br | —O— |
| I-299 | Me | OMe | 2-Br | 4-Br | —O— |
| I-300 | MeCO— | OMe | 2-Br | 4-Br | —O— |
| I-301 | Me₂NCO— | OMe | 2-Br | 4-Br | —O— |
| I-302 | H | OMe | 2-Br | 4-Br | —CH₂O— |
| I-303 | H | OMe | 2-Br | 4-Br | —OCH₂— |
| I-304 | H | OEt | 2-Br | 4-CF₃ | —O— |
| I-305 | H | O—iPr | 2-Br | 4-CF₃ | —O— |
| I-306 | H | OCH₂(C₃H₅) | 2-Br | 4-CF₃ | —O— |
| I-307 | H | O—nPr | 2-Br | 4-CF₃ | —O— |
| I-308 | H | O—nBu | 2-Br | 4-CF₃ | —O— |
| I-309 | Me | O—tBu | 2-Br | 4-CF₃ | —O— |
| I-310 | H | NMe₂ | 2-Br | 4-CF₃ | —O— |
| I-311 | H | NEt₂ | 2-Br | 4-CF₃ | —O— |
| I-312 | H | Morphorino- | 2-Br | 4-CF₃ | —O— |
| I-313 | H | Piperidino- | 2-Br | 4-CF₃ | —O— |
| I-314 | Me | OMe | 2-Br | 4-CF₃ | —O— |
| I-315 | MeCO— | OMe | 2-Br | 4-CF₃ | —O— |
| I-316 | Me₂NCO— | OMe | 2-Br | 4-CF₃ | —O— |
| I-317 | H | OMe | 2-Br | 4-CF₃ | —CH₂O— |
| I-318 | H | OMe | 2-Br | 4-CF₃ | —OCH₂— |
| I-319 | H | OEt | 2-Br | 4-OCF₃ | —O— |
| I-320 | H | O—iPr | 2-Br | 4-OCF₃ | —O— |
| I-321 | H | OCH₂(C₃H₅) | 2-Br | 4-OCF₃ | —O— |
| I-322 | H | O—nPr | 2-Br | 4-OCF₃ | —O— |
| I-323 | H | O—nBu | 2-Br | 4-OCF₃ | —O— |
| I-324 | H | O—tBu | 2-Br | 4-OCF₃ | —O— |
| I-325 | H | NMe₂ | 2-Br | 4-OCF₃ | —O— |
| I-326 | H | NEt₂ | 2-Br | 4-OCF₃ | —O— |
| I-327 | H | Morphorino- | 2-Br | 4-OCF₃ | —O— |
| I-328 | H | Piperidino- | 2-Br | 4-OCF₃ | —O— |
| I-329 | Me | OMe | 2-Br | 4-OCF₃ | —O— |
| I-330 | MeCO— | OMe | 2-Br | 4-OCF₃ | —O— |
| I-331 | Me₂NCO— | OMe | 2-Br | 4-OCF₃ | —O— |
| I-332 | H | OMe | 2-Br | 4-OCF₃ | —CH₂O— |
| I-333 | H | OMe | 2-Br | 4-OCF₃ | —OCH₂— |
| I-334 | H | OMe | 2-F | 4-Cl | —O— |
| I-335 | H | OMe | 2-F | 4-MeO | —O— |
| I-336 | H | OMe | 2-F | 2-Cl | —O— |
| I-337 | H | OMe | 2-F | 3-Cl | —O— |
| I-338 | H | OMe | 2-F | 2, 4-Cl₂ | —O— |
| I-339 | H | OMe | 2-F | 4-OCF₃ | —O— |
| I-340 | H | OMe | 2-F | 4-CF₃ | —O— |
| I-341 | H | OMe | 2-F | 4-tBu | —O— |
| I-342 | H | OMe | 2-F | 4-Br | —O— |
| I-343 | H | OMe | 2-F | 4-F | —O— |
| I-344 | H | OMe | 2-F | 3, 4-Cl₂ | —O— |
| I-345 | H | OMe | 2-F | 3, 4-F₂ | —O— |
| I-346 | H | OMe | 2-F | 3-F, 4-Cl | —O— |
| I-347 | H | OMe | 2-F | 3-Cl, 4-F | —O— |
| I-348 | H | OMe | 2-F | 2, 4-F₂ | —O— |
| I-349 | H | OMe | 2-F | 2-F, 4-Cl | —O— |
| I-350 | H | OMe | 2-F | 4-SF₅ | —O— |
| I-351 | H | OMe | 2-F | 4-Me | —O— |
| I-352 | H | OMe | 2-F | 4-CN | —O— |
| I-353 | H | OMe | 2-F | 3, 4, 5-Cl₃ | —O— |
| I-354 | H | OMe | 2-F | 3, 4, 5-F₃ | —O— |
| I-355 | H | OMe | 2-F | 2, 4, 6-Cl₃ | —O— |
| I-356 | H | OMe | 2-F | 2, 4, 6-F₃ | —O— |
| I-357 | H | OMe | 2-F | 3-F, 4-Br | —O— |
| I-358 | H | OMe | 2-F | 3-Br, 4-F | —O— |
| I-359 | H | OMe | 2-F | 2, 4-Br₂ | —O— |
| I-360 | H | OMe | 2-F | 2-F, 4-Br | —O— |
| I-361 | H | OMe | 2-F | 3-Cl, 4-Br | —O— |
| I-362 | H | OMe | 2-F | 3-Br, 4-Cl | —O— |
| I-363 | H | OEt | 2-F | 4-Cl | —O— |
| I-364 | H | O—iPr | 2-F | 4-Cl | —O— |
| I-365 | H | OCH₂(C₃H₅) | 2-F | 4-Cl | —O— |
| I-366 | H | O—nPr | 2-F | 4-Cl | —O— |
| I-367 | H | O—nBu | 2-F | 4-Cl | —O— |
| I-368 | H | O—iBu | 2-F | 4-Cl | —O— |
| I-369 | H | O—tBu | 2-F | 4-Cl | —O— |
| I-370 | H | O—C₅H₁₂ | 2-F | 4-Cl | —O— |
| I-371 | H | NHMe | 2-F | 4-Cl | —O— |
| I-372 | H | NMe₂ | 2-F | 4-Cl | —O— |
| I-373 | H | NHEt | 2-F | 4-Cl | —O— |
| I-374 | H | NEt₂ | 2-F | 4-Cl | —O— |
| I-375 | H | NH-nPr | 2-F | 4-Cl | —O— |
| I-376 | H | N(nPr)₂ | 2-F | 4-Cl | —O— |
| I-377 | H | Morphorino- | 2-F | 4-Cl | —O— |
| I-378 | H | Piperidino- | 2-F | 4-Cl | —O— |
| I-379 | H | Pyrrolidino- | 2-F | 4-Cl | —O— |
| I-380 | Me | OCH₃ | 2-F | 4-Cl | —O— |
| I-381 | MeCO— | OCH₃ | 2-F | 4-Cl | —O— |
| I-382 | tBuCO— | OCH₃ | 2-F | 4-Cl | —O— |
| I-383 | PhCO— | OCH₃ | 2-F | 4-Cl | —O— |
| I-384 | C₃H₅CO— | OCH₃ | 2-F | 4-Cl | —O— |
| I-385 | MeOCO— | OCH₃ | 2-F | 4-Cl | —O— |
| I-386 | Me₂NCO— | OCH₃ | 2-F | 4-Cl | —O— |
| I-387 | H | OMe | 2-F | 4-Cl | —S— |
| I-388 | H | OMe | 2-F | 4-Cl | —S(O)— |
| I-389 | H | OMe | 2-F | 4-Cl | —S(O)₂— |
| I-390 | H | OMe | 2-F | 4-Cl | —NH— |
| I-391 | H | OMe | 2-F | 4-Cl | —NMe— |
| I-392 | H | OMe | 2-F | 4-Cl | —N(CH₂Ph)— |
| I-393 | H | OMe | 2-F | 4-Cl | —CH₂O— |
| I-394 | H | OMe | 2-F | 4-Cl | —OCH₂— |
| I-395 | H | OEt | 2-F | 4-Br | —O— |
| I-396 | H | O—iPr | 2-F | 4-Br | —O— |
| I-397 | H | OCH₂(C₃H₅) | 2-F | 4-Br | —O— |
| I-398 | H | O—nPr | 2-F | 4-Br | —O— |
| I-399 | H | O—nBu | 2-F | 4-Br | —O— |
| I-400 | H | O—tBu | 2-F | 4-Br | —O— |
| I-401 | H | NMe₂ | 2-F | 4-Br | —O— |
| I-402 | H | NEt₂ | 2-F | 4-Br | —O— |
| I-403 | H | Morphorino- | 2-F | 4-Br | —O— |
| I-404 | H | Piperidino- | 2-F | 4-Br | —O— |
| I-405 | H | OMe | 2-F | 4-Br | —O— |
| I-406 | MeCO— | OMe | 2-F | 4-Br | —O— |

TABLE 1-continued

| Compound No. | R¹ | R² | $(R^3)_n$ | $(R^4)_m$ | Y |
|---|---|---|---|---|---|
| I-407 | Me₂NCO— | OMe | 2-F | 4-Br | —O— |
| I-408 | H | OMe | 2-F | 4-Br | —CH₂O— |
| I-409 | H | OMe | 2-F | 4-Br | —OCH₂— |
| I-410 | H | OEt | 2-F | 4-CF₃ | —O— |
| I-411 | H | O—iPr | 2-F | 4-CF₃ | —O— |
| I-412 | H | OCH₂(C₃H₅) | 2-F | 4-CF₃ | —O— |
| I-413 | H | O—nPr | 2-F | 4-CF₃ | —O— |
| I-414 | H | O—nBu | 2-F | 4-CF₃ | —O— |
| I-415 | H | O—tBu | 2-F | 4-CF₃ | —O— |
| I-416 | | | | | |
| I-417 | H | Morphorino- | 2-F | 4-CF₃ | —O— |
| I-418 | H | Piperidino- | 2-F | 4-CF₃ | —O— |
| I-419 | H | OMe | 2-F | 4-CF₃ | —O— |
| I-420 | Me | OMe | 2-F | 4-CF₃ | —O— |
| I-421 | MeCO— | OMe | 2-F | 4-CF₃ | —O— |
| I-422 | Me₂NCO— | OMe | 2-F | 4-CF₃ | —O— |
| I-423 | H | OMe | 2-F | 4-CF₃ | —CH₂O— |
| I-424 | H | OMe | 2-F | 4-CF₃ | —OCH₂— |
| I-425 | H | OEt | 2-F | 4-OCF₃ | —O— |
| I-426 | H | O—iPr | 2-F | 4-OCF₃ | —O— |
| I-427 | H | OCH₂(C₃H₅) | 2-F | 4-OCF₃ | —O— |
| I-428 | H | O—nPr | 2-F | 4-OCF₃ | —O— |
| I-429 | H | O—nBu | 2-F | 4-OCF₃ | —O— |
| I-430 | H | O—tBu | 2-F | 4-OCF₃ | —O— |
| I-431 | H | NMe₂ | 2-F | 4-OCF₃ | —O— |
| I-432 | H | NEt₂ | 2-F | 4-OCF₃ | —O— |
| I-433 | H | Morphorino- | 2-F | 4-OCF₃ | —O— |
| I-434 | H | Piperidino- | 2-F | 4-OCF₃ | —O— |
| I-435 | Me | OMe | 2-F | 4-OCF₃ | —O— |
| I-436 | MeCO— | OMe | 2-F | 4-OCF₃ | —O— |
| I-437 | Me₂NCO— | OMe | 2-F | 4-OCF₃ | —O— |
| I-438 | H | OMe | 2-F | 4-OCF₃ | —CH₂O— |
| I-439 | H | OMe | 2-F | 4-OCF₃ | —OCH₂- |

Another example of the particularly preferred azole derivative (I) is represented by the following Chemical Formula (Ib).

[Chemical Formula 5]

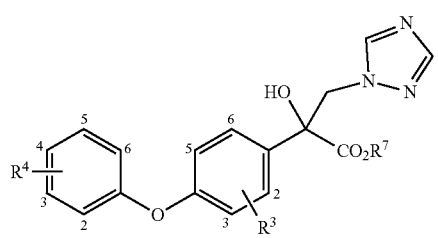

(Ib)

In the formula (Ib), $R^7$ is methyl, ethyl, n-propyl, isopropyl, or t-butyl. In the formula (Ib), $R^3$ is 2-methyl, 2-isopropyl, 2-t-butyl, 2-methoxy, 2-trifluoromethyl, 2-trichloromethyl, 2-fluoro, 2-chloro, 2-bromo, 2,6-dichloro, or 2,3-dichloro. In the formula (Ib), $R^4$ is hydrogen, 2-chloro, 3-chloro, 4-chloro, 2,4-dichloro, 2,3-dichloro, 2,4,6-trichloro, 4-trifluoromethyl, 4-trifluoromethoxy, 4-phenyl, or 4-phenoxy. The prefix numbers of each organic group illustrated in the description of $R^3$ and $R^4$ indicate the bonding position in the benzene ring.

Among them, $R^7$ in the formula (Ib) is preferably methyl, ethyl, n-propyl, and isopropyl, $R^3$ is preferably 2-trifluoromethyl, 2-trichloromethyl, 2-fluoro, 2-chloro, and 2-bromo, and $R^4$ is preferably 2-chloro, 3-chloro, 4-chloro, 2,4-dichloro, 4-trifluoromethyl, and 4-trifluoromethoxy.

[2. Method for Producing Azole Derivative]

The azole derivative (I) can be produced by any of the three methods described below. In the methods 1 to 3 for producing azole derivatives described below, a specific form of the azole derivative (1) is described for convenience of explanation, but other forms can also be produced by changing the starting materials.

$R^1$, $R^2$, $R^3$, $R^4$, $R^7$, A, and D in the following scheme correspond to $R^1$, $R^2$, $R^3$, $R^4$, $R^7$, A, and D in the above general formula (I), respectively.

(1) Method 1 of Producing Azole Derivative

The azole derivative (I) can be produced from a compound obtained by a known technique according to the overall scheme 1 below.

Overall scheme 1

[Chemical Formula 6]

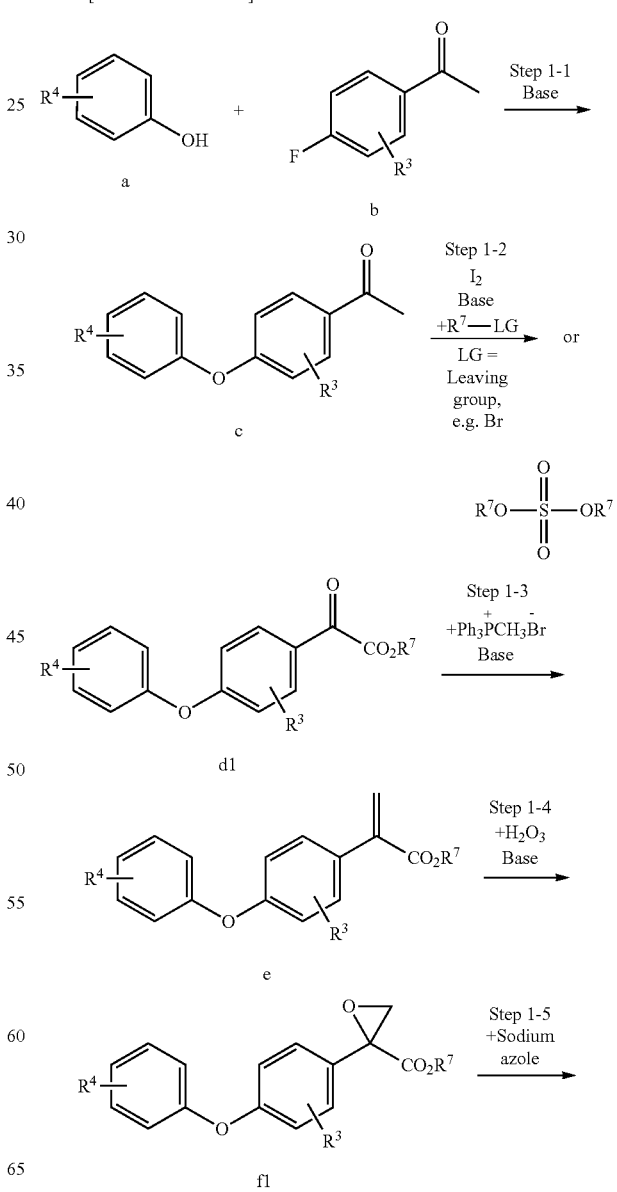

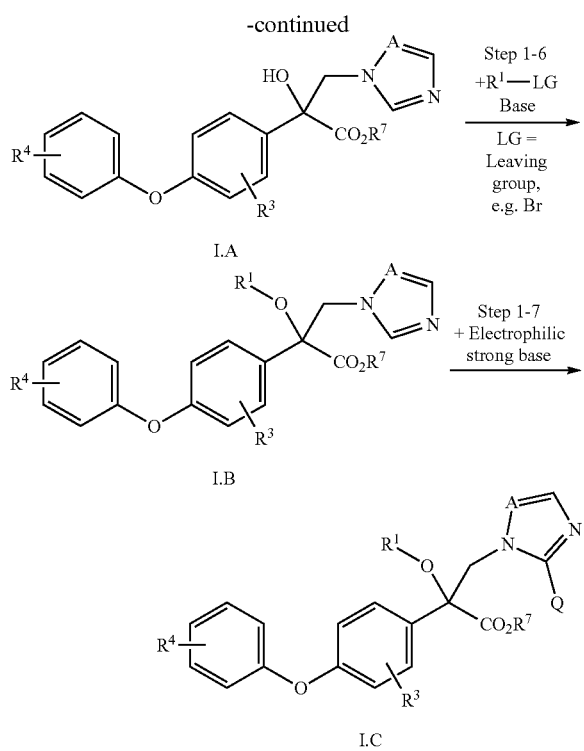

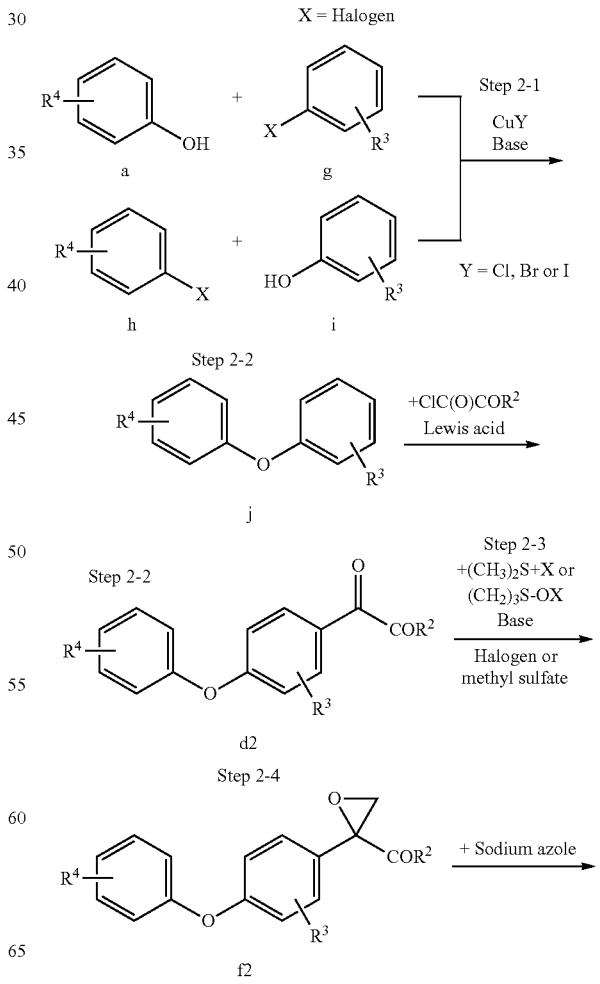

general formula I.A in which $R^1$ is hydrogen, D is hydrogen, $R^2$ is —$OR^7$, Z and E are phenyl, and Y is O (hereinafter referred to as compound I.A).

(Step 1-6) When appropriate, the compound I.A is subsequently reacted with $R^1$-LG in the presence of a base such as NaH, preferably in a suitable solvent such as THF to obtain the compound represented by the general formula I.B (hereinafter referred to as compound I.B). LG is a nucleophilically substitutable leaving group, such as a leaving group selected from halogen, alkylsulfonyloxy, and arylsulfonyloxy groups, preferably a bromine or iodine group.

(Step 1-7) The compound I.B is reacted with an electrophilic agent such as sulfur, iodine, iodine monochloride, and dibromotetrafluoroethane in the presence of a strong base such as butyllithium, lithium diisopropylamide, and potassium hexamethyldisilazide to obtain a compound represented by the general formula I.C.

(2) Method 2 of Producing Azole Derivative

The azole derivative (I) of the present invention can be produced from a compound obtained by a known technique according to the overall scheme 2 below.

Overall scheme 2

[Chemical Formula 7]

(Step 1-1) In Production Method 1, in the above scheme 1, a phenol compound represented by the general formula a (hereinafter referred to as phenol a) is reacted with an acetophenone compound represented by the general formula b (hereinafter referred to as acetophenone b) in the presence of a base to obtain a compound represented by the general formula c (hereinafter referred to as compound c).

(Step 1-2) The resulting compound c is reacted with iodine in a suitable solvent such as dimethyl sulfoxide (DMSO). A suitable base such as carbonate is added to it and further reacted with dialkyl sulfate ($R^7OS(=O)_2OR^7$) or $R^7$-LG to obtain a compound represented by the general formula d1 (hereinafter referred to as compound d1). The carbonate includes sodium carbonate, potassium carbonate, cesium carbonate, and lithium carbonate, and preferably potassium carbonate. LG represents a nucleophilically substitutable leaving group, such as a leaving group selected from a halogen group, an alkylsulfonyloxy group, and an arylsulfonyloxy group, preferably a halogen group, and even more preferably a bromine group or an iodine group.

(Step 1-3) The compound d1 is reacted with methyltriphenylphosphonium halide in the presence of any solvent such as toluene, tetrahydrofuran (THF), or DMSO, and in the presence of a base such as potassium tert-butoxide or sodium hydride to obtain an acrylate compound represented by the general formula e (hereinafter referred to as acrylate e).

(Step 1-4) The acrylate e is reacted with an aqueous solution of hydrogen peroxide or its mixture with sodium carbonate or urea in a solvent such as methanol or acetonitrile and preferably in the presence of a base such as sodium bicarbonate or potassium carbonate, to obtain an epoxide compound represented by the general formula f1 (hereinafter referred to as epoxide compound f1).

(Step 1-5) The epoxide compound f1 is reacted with sodium azole in an organic solvent, preferably dimethylformamide (DMF), to obtain a compound represented by the

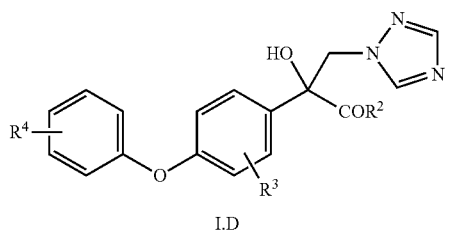

I.D (Step 2-1) In Production Method 2, a phenol a and a halobenzene compound represented by the general formula g, or a phenol compound represented by the general formula i and a halobenzene compound represented by the general formula h in the overall scheme 2 are reacted in the presence of CuY as appropriate, and preferably in the presence of a base to obtain a compound represented by the general formula j (hereinafter referred to as compound j). Here, Y represents a chlorine group, a bromine group, or an iodine group.

(Step 2-2) The compound j is reacted with alkyl chloroglyoxylate in the presence of a Lewis acid, preferably aluminum chloride or iron (III) chloride, to obtain a compound d2. The compound d2 may be obtained in the same manner as d1 in Production Method 1, and may lead to the compound I.A, I.B, or I.C in the same manner as d1 in Production Method 1.

(Step 2-3) The compound d2 is reacted with a compound selected from trimethyl sulfonium halide, trimethyl sulfonium methylsulfate, trimethyl sulfoxonium halide, and trimethyl sulfoxonium methylsulfate in the presence of a base, such as sodium hydride, sodium tert-butoxide, or cesium carbonate to obtain an epoxide compound f2.

(Step 2-4) The epoxide compound f2 is reacted with sodium azole in the presence of an organic solvent such as DMF to obtain a compound I.D in which $R^1$ in the general formula (I) is hydrogen, D is hydrogen, Z and E are phenyl, and Y is O. The compound I.D may be further derivatized.

(3) Method 3 of Producing Azole Derivative

Alternatively, the azole derivative (I) of the present invention can be produced from compounds obtained by a known technique according to the overall scheme 3 below.

Overall scheme 3

[Chemical Formula 8]

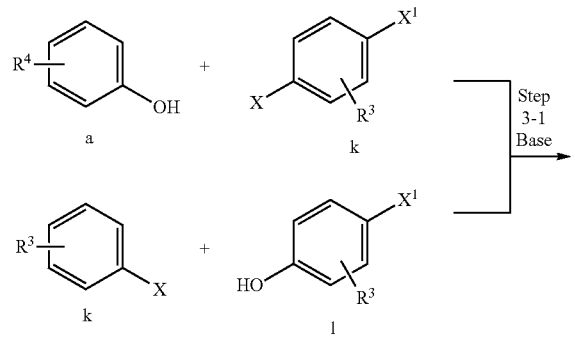

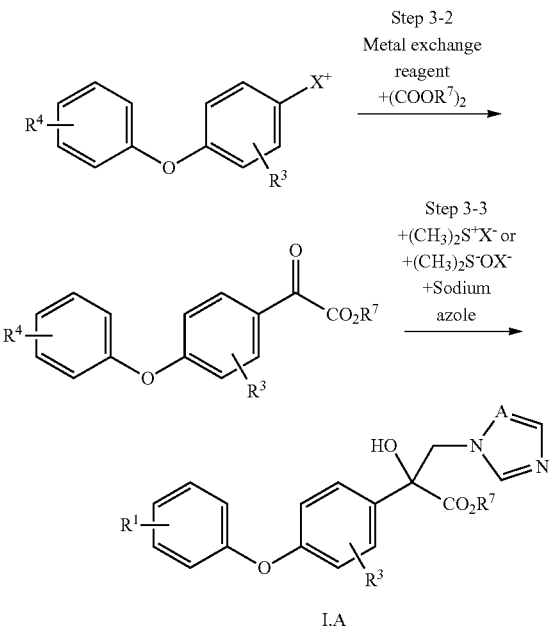

I.A (Step 3-1) In Production Method 3, in the overall scheme 3, the phenol a and a halobenzene compound represented by the general formula k are reacted, or a phenol compound represented by the general formula I and a halobenzene compound represented by the general formula h are reacted to obtain a compound represented by the general formula m (hereinafter referred to as compound m). Here, X1 is a bromine group or an iodine group.

(Step 3-2) The compound m is converted to an organometallic reagent by reacting with a metal exchange reagent such as butyllithium or isopropylmagnesium chloride, followed by reaction with dialkyl oxalate $(COOR^7)_2$, to obtain a compound d1. The compound d1 may be obtained in the same manner as d2 in Production Method 1 or 2, and may lead to the compound I.A, I.B, I.C, or I.D in the same manner as in Production Method 1 or 2.

(Step 3-3) The compound d1 is reacted with trimethyl sulfonium halide, trimethyl sulfonium methylsulfate, trimethyl sulfoxonium halide or trimethyl sulfoxonium methylsulfate in the presence of sodium azole to obtain a compound I.A represented by the general formula (I) in which $R^1$ is hydrogen, D is hydrogen, $R^2$ is-$OR^7$, Z and E are phenyl, and Y is O. The compound I.A may be further derivatized.

In the above Production Methods 1 to 3, a specific form of the azole derivative (I) is described for convenience of explanation, but is not limited to this. For example, Production Methods 1 to 3 describe a form in which Z in the general formula (I) is a phenyl group, but Z is not limited to a phenyl group. For example, it is possible to produce the azole derivative (I) in which Z is other than a phenyl group in the same manner as in Production Methods 1 to 3, using, as a starting material, a commercially available compound in which a hydroxyl group and preferred $R^4$ are bonded to a naphthyl group, a 5- or 6-membered aromatic heterocyclic ring containing from 1 to 4 heteroatoms selected from O, N, or S, or a 9- or 10-membered aromatic heterocyclic ring consisting of two rings instead of the phenol a.

Production methods 1 to 3 describe a form in which E in the general formula (I) is a phenyl group, but E is not limited to a phenyl group. For example, it is possible to produce the azole derivative (I) in which E is other than a phenyl group in the same manner as in Production Method 1 by using a compound in which a keto group, a fluoro group, and a preferred $R^3$ are bonded to a 6-membered aromatic heterocyclic ring containing 1 or 2 N atoms instead of acetophenone b.

It is also possible to produce the azole derivative (1) in which E is other than a phenyl group by the following method, as in Production Method 2.

(a) A compound in which a chlorine, bromine, or iodine group, and a preferred $R^3$, is bonded to a 6-membered aromatic heterocyclic ring containing 1 or 2 N atoms is used in place of a halobenzene compound represented by the general formula g.

(b) A compound in which a hydroxyl group and a preferred $R^3$ are bonded to a 6-membered aromatic heterocyclic ring containing 1 or 2 N atoms is used in place of the phenolic compound represented by the general formula i.

It is also possible to produce the azole derivative (1) in which E is other than a phenyl group by the following method, as in Production Method 3.

(c) A compound in which a first halogen group selected from a chlorine group, a bromine group, and an iodine group, a second halogen group selected from a bromine group and an iodine group, and a preferred $R^3$ are bonded to a 6-membered aromatic heterocyclic rings containing 1 or 2 N atoms is used in place of a halobenzene compound represented by the general formula k.

(d) A compound in which a bromine or iodine group, a hydroxyl group, and a preferred $R^3$ are bonded to a 6-membered aromatic heterocyclic ring containing 1 or 2 N atoms is used in place of a phenolic compound represented by the general formula I.

In Production Methods 1 to 3, Y in the general formula (I) is an oxygen atom, but Y is not limited to an oxygen atom. An azole derivative (I) in which Y is other than an oxygen atom can be produced by the same method as in Production Methods 1 to 3 by using, as the starting material, for example, a commercially available compound in which —$CH_2OH$, —$OCH_3$, —$NH_2$, —N(—$C_1$-$C_4$-alkyl)H, —N(—$C_3$-$C_6$-cycloalkyl)H, or —$S(O)_pH$ is bonded to a compound corresponding to Z in the general formula (I) (i.e., benzene, naphthalene, pyrrole, pyridine, pyrimidine, thiophene, etc. to which $R^4$ is bonded) instead of the phenol a.

[3. Other Active Ingredients]

Examples of the other active ingredient contained with the azole derivative (I) include known active ingredients in fungicides, insecticides, miticides, nematicides, and plant growth regulators, among which known active ingredients in fungicides, insecticides, and plant growth regulators are preferred.

(1) Active Ingredients of Fungicide

Known active ingredients contained in fungicides include nucleic acid synthesis and metabolism inhibitors, mitotic division/cell division inhibitors, respiratory inhibitors, amino acid/protein biosynthesis inhibitors, signal transduction inhibitors, lipid biosynthesis or transport/cell membrane structure or function inhibitors, cell membrane sterol biosynthesis inhibitors, cell wall biosynthesis inhibitors, melanin biosynthesis inhibitors, host plant resistance inducers, and multi-site fungicides.

Specifically, the nucleic acid synthesis and metabolism inhibitor may include at least one selected from, for example, benalaxyl, benalaxyl-M, furalaxyl, ofurace, bupyrimate, dimethirimol, ethirimol, octhilinone, metalaxyl, metalaxyl-M, oxadixyl, and hymexazol.

The mitotic division/cell division inhibitor may include at least one selected from, for example, benomyl, carbendazim, fuberidazole, thiabendazole, thiophanate, thiophanate-methyl, diethofencarb, zoxamide, ethaboxam, pencycuron, fluopicolide, phenamacril, metrafenone, and pyriofenone.

The respiratory inhibitor may include at least one selected from, for example, tolfenpyrad, diflumetorim, fenazaquin, pydiflumetofen, fenfuram, carboxin, oxycarboxin, benodanyl, flutolanil, mepronil, isofetamid, benzovindiflupyr, bixafen, fluindapyr, fluxapyroxad, furametpyr, inpyrfluxam, isopyrazam, penflufen, penthiopyrad, sedaxane, isoflucypram, boscalid, fluopyram, thifluzamide, pyraziflumid, pyribencarb, fluoxastrobin, fenamidon, mandestrobin, azoxystrobin, coumoxystrobin, enoxastrobin, flufenoxystrobin, picoxystrobin, pyraclostrobin, pyraoxystrobin, triclopyricarb, famoxadone, dimoxystrobin, fenaminstrobin, metminostrobin, orysastrobin, kresoxim-methyl, trifloxystrobin, cyazofamid, amisulbrom, fenpicoxamid, florylpicoxamid, binapacryl, meptyldinocap, dinocap, fluazinam, triphenyltin acetate, triphenyltin chloride, triphenyltin hydroxide, silthiopham, ametoctradin, metyltetraprole, pyrapropoyne, and inpyrfluxam.

The amino acid/protein biosynthesis inhibitor may include at least one selected from, for example, cyprodinil, mepanipyrim, pyrimethanil, blasticidin, kasugamycin, streptomycin, and oxytetracycline.

The signal transduction inhibitor may include at least one selected from, for example, quinoxyfen, proquinazid, chlozolinate, dimethachlon, fenpiclonil, fludioxonil, iprodione, procymidone, and vinclozolin.

The lipid biosynthesis or transport/cell membrane structure or function inhibitor may include at least one selected from, for example, isoprothiolan, edifenphos, iprobenfos (IBP), pyrazophos, biphenyl, chloroneb, dichloran, quintozen (PCNB), tecnazene (TCNB), tolclofos-methyl, etridiazole, prothiocarb, propamocarb, natamycin, oxathiapiprolin, and fluoxapiprolin.

The cell membrane sterol biosynthesis inhibitor may include at least one selected from, for example, imazalil, oxpoconazole, pefurazoate, prochloraz, triflumizole, triforine, pyrifenox, pyrisoxazole, fenarimol, nuarimol, azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, metconazole, ipconazole, myclobutanil, penconazole, propiconazole, simeconazole, tebuconazole, tetraconazole, triadimefon, triadimenol, triticonazole, mefentrifluconazole, prothioconazole, tridemorph, fenpropimorph, fenpropidin, piperaline, spiroxamine, fenpyrazamine, fenhexamid, naphthifine, terbinafine, pyributicarb, and ipfentrifluconazole.

The cell wall biosynthesis inhibitor may include at least one selected from, for example, polyoxin, dimethomorph, flumorph, pyrimorph, mandipropamid, benthiavalicarb, iprovalicarb, and valifenalate.

The melanin biosynthesis inhibitor may include at least one selected from, for example, fthalide, tricyclazole, pyrokyron, carpropamid, diclocymet, fenoxanil, and tolprocarb.

The host plant resistance inducer may include at least one selected from, for example, acibenzolar-S-methyl, probenazole, tiadinil, laminarin, isotianil, laminarin, fosetyl-AI, phosphorous acid, and phosphonates.

The multi-site fungicide may include at least one selected from, for example, cymoxanil, tecloftalam, triazoxide, flusulfamide, diclomezine, cyflufenamide, dodine, flutianil, ferimzone, tebufloquin, picarbutrazox, validamycin, mineral oil, baking soda, potassium carbonate, copper and copper compounds, sulfur, ferbam, mancozeb, maneb, metriram, propineb, thiram, zineb, ziram, captan, captafol, folpet, chlorothalonil (TPN), dithianon, iminoctadine acetate, iminoctadine albesilate, anilazine, dithianone, fluoroimide, methasulfocarb, florylpicoxamid, fluopimomide, ipflufenoquin, quinomethionate, pyridachlometyl, aminopyrifen, dichlobentiazox, quinofumelin, and dipymetitrone.

(2) Active Ingredients of Insecticide

Examples of known active ingredients contained in insecticides include nicotinic acetylcholine receptor antagonizing modulators, sodium channel modulators, ryanodine receptor modulators, acetylcholinesterase inhibitors, oxidative phosphorylation uncouplers, and mitochondrial electron transport chain complex I inhibitors.

Specifically, the nicotinic acetylcholine receptor antagonizing modulators may include at least one selected from, for example, acetamiprid, clothianidin, dinotefuran, imidacloprid, nitenpyram, thiacloprid, thiamethoxam, sulfoxaflor, flupyradifurone, and triflumezopyrim.

The sodium channel modulator may be at least one pyrethroid compound selected from, for example, acrinathrin, allethrin, cypermethrin, bifenthrin, cycloprothrin, cyhalothrin, cypermethrin, deltamethrin, dimefluthrin, esfenvalerate, etofenprox, fenpropathrin, fenvalerate, flubrocythrinate, flucythrinate, fluvalinate, halfenprox, cyhalothrin, metofluthrin, momfluorothrin, permethrin, profluthrin, tefluthrin, tralomethrin, cyfluthrin, bifenthrin, imiprothrin, pyrethrin, cyphenothrin, chloroprallethrin, epsilon-metofluthrin, and epsilon-momfluorothrin.

The ryanodine receptor modulator may include at least one selected from, for example, chlorantraniliprole, cyantraniliprole, flubendiamide, and cyhalodiamide.

The acetylcholinesterase inhibitor may include at least one selected from, for example, acephate, azinphos-methyl, cadusafos, chlorethoxyfos, chlorfenvinphos, chlorpyrifos, cyanophos, demeton-S-methyl, diazinon, dichlorvos (DDVP), dicrotophos, dimethoate, disulfoton, ethion, ethoprophos, EPN, fenamiphos, fenitrothion (MEP), fenthion (MPP), fosthiazate, imicyafos, isofenphos, isoxathion, malathion, methamidophos, methidathion, mevinphos, monocrotophos, omethoate, oxydemeton-methyl, parathion, parathion-methyl, phenthoate, phorate, phosalone, phosmet, phosphamidon, phoxim, pirimiphos-methyl, profenofos, prothiofos, pyraclofos, pyridaphenthion, quinalphos, tebupirimphos, terbufos, triazophos, trichlorfon (DEP), alanycarb, aldicarb, benfuracarb, BPMC, carbaryl (NAC), carbofuran, carbosulfan, cartap, fenoxycarb (BPMC), formetanate, isoprocarb (MIPC), methiocarb, methomyl, oxamyl, pirimicarb, thiodicarb, XMC, bendiocarb, ethiofencarb, fenobucarb, fenothiocarb, furathiocarb, metolcarb, and xylylcarb.

The oxidative phosphorylation uncoupler may include at least one selected from, for example, chlorfenapyr, DNOC, and sulfluramide.

The mitochondrial electron transport chain complex I inhibitor may include at least one selected from, for example, tebufenpyrad, tolfenpyrad, fenazaquin, fenpyroximate, pyridaben, pyrimidifen, and rotenone.

(3) Active Ingredients of Plant Growth Regulator

The active ingredient of the plant growth regulator comprises at least one selected from, for example, aminoethoxyvinylglycine, chlormequat, chlorpropham, cyclanilide, dikeglac, daminozide, ethephon, flurprimidol, flumetralin, forchlorfenuron, gibberellin, hydrazide maleate, mepiquat chloride, methylcyclopropene, benzylaminopurine, paclobutrazol, prohexadione, thidiazuron, tributylphosphorotrithioate, trinexapac-ethyl, and uniconazole.

(4) Active Ingredients of Miticide

Examples of known active ingredients contained in miticids include acequinocyl, amidoflumet, amitraz, azocyclotin, bifenazate, bromopropylate, chlorfenson, chinomethionat, phenisobromolate, benzoximate, clofentezine, cyenopyrafen, cyflumetofen, cyhexatin, diflovidazin, dienochlor, etoxazole, fenazaquin, fenbutatin oxide, fenpyroximate, fenothiocarb, fluacrypyrim, hexythiazox, propargite (BPPS), pyflubumide, pyridaben, pyrimidifen, spirodiclofen, spiromesifen, tebufenpyrad, tetradifon, acynonapyr, and blended oils.

(5) Active Ingredients of Nematicide

Examples of known active ingredients contained in nematicides (nematicidal active ingredient) include D-D (1,3-dichloropropene), DCIP (dichlorodiisopropyl ether), methyl isothiocyanate, carbam sodium salt, cadusafos, fosthiazate, imicyafos, morantel tartrate, levamisole hydrochloride, nemadectin, and tioxazafen.

[4. Agricultural or Horticultural Fungicide]

Since the azole derivative (I) has an imidazolyl group or 1,2,4-triazolyl group, it forms an acid addition salt of inorganic acids and organic acids, or a metal complex. Therefore, it can be used as an active ingredient in agricultural or horticultural fungicides along with other active ingredients as part of acid addition salts and metal complexes.

(1) Plant Disease Controlling Effect

The agricultural or horticultural fungicide in the present embodiment exhibits a controlling effect against a wide range of plant diseases.

Examples of applicable diseases include the following. Note that, in the parenthesis after each disease name, major pathogenic fungus (fungi) that causes the disease is(are) indicated. Examples thereof include Asian soybean rust (*Phakopsora pachyrhizi, Phakopsora meibomiae*), brown spot of soybean (*Zymoseptria glycines*), purple blotch of soybean (*Cercospora kikuchii*), *Alternaria* leaf spot of soybean (*Alternaria* sp.), anthracnose of soybean (*Collectotrichum truncatum*), frogeye leaf spot of soybean (*Cercocopora sojina*), *Rhizoctonia* root rot of soybean (*Rhizoctonia solani*), *Rhizoctonia* foliar blight of soybean (*Rhizoctonia solani*), pod and stem blight of soybean (*Diaporthe phaseolorum*), phytophthora root and stem rot of soybean (*Phytophthora sojae*), anthracnose of bean (*Colletotrichum lindemutianum*), phoma leaf spot/stem canker of rapeseed (*Leptosphaeria maculans, Leptosphaeria biglobosa*), light leaf spot of rapeseed (*Pyrenopeziza brassicae*), club root of rapeseed (*Plasmodiophora brassicae*), *Verticillium* wilt of rapeseed (*Verticillium longisporum*), *Alternaria* blackspot of rapeseed (*Alternaria* spp), rice blast (*Pyricularia oryzae*), brown spot of rice (*Cochliobolus myabeanus*), bacterial leaf blight of rice (*Xanthomonas oryzae*), rice sheath blight (*Rhizoctonia solani*), stem rot of rice (*Helminthosporium sigmodeen*), bakanae disease of rice (*Fusarium fujikuroi*), rice seedling blight (*Pythium aphanidermatum*), rice take-all (*Pythium graminicola*), powdery mildew of wheat (*Erysiphe graminis* f.sp *hordei*), barley stem rust (*Puccinia graminis*), yellow rust of barley (*Puccinia striiformis*), leaf stripe of barley (*Pyrenophora graminea*), scald of barley (*Rhynchosporium secalis*), loose smut of barley (*Ustilago nuda*), net blotch of barley (*Pyrenophora teres*), *Fusarium* head blight of barley (*Fusarium graminearum, Microdochium nivale*), powdery mildew of wheat (*Erysiphe graminis* f. sp. *tritici*), leaf rust of wheat (*Puccinia recondita*), yellow rust of wheat (*Puccinia striiformis*), eyespot of wheat (*Pseudocercosporella herpotrichoides*), Fusarium head blight of wheat (*Fusarium graminearum, Microdochium nivale*), glume blotch of wheat (*Phaeosphaeria nodorum*), septoria leaf blotch of wheat (*Zymoseptoria tritici*), pink snow mold of wheat (*Microdochium nivale*), take-all of wheat (*Gaeumannomyces graminis*), wheat glume spot (*Epicoccum* spp.), yellow leaf spot of wheat (*Pyrenophora tritici-repentis*), *Typhula* snow blight of wheat (*Typhula incarnata, Typhula ishikariensis*), dollar spot of grasses (*Sclerotinia homoeocarpa*), grass large patch (*Rhizoctonia solani*), brown patch (*Rhizoctonia solani*), grass anthracnose (*Colletotrichum graminicola*), gray leaf spot of grass (*Pyricularia grisea*), necrotic ring spot of grass (*Ophiosphaerella korrae*), red thread disease of grass (*Laetisaria fuciformis*), grass rust (*Puccinia zoysiae*), summer patch of grass (*Magnaporthe poae*), take-all root rot of grass (*Gaeumannomyces graminis*), brown ring patch (*Waitea circinata*), fairy ring of grass (*Agaricus, Calvatia, Chlorophyllum, Clitocybe, Lepiota, Lepista, Lycoperdon, Marasmius, Scleroderma, Tricholoma*, and the like), pink snow mold of grass (*Microdochium nivale*), gray snow moldof grass (*Typhula* incarnate, *Typhula* incarnation), *Curvularia* leaf blight of grass (*Curvularia* sp.), *Rhizoctonia* patch (*Ceratobasidium* sp.), *Zoysia* decline (*Gaeumannomyces* sp., *Phialophora* sp.), corn smut (*Ustilago maydis*), anthracnose of corn (*Colletotrichum graminicola*), eyespot of corn (*Kabatiella zeae*), gray leaf spot of corn (*Cercospora zeae-maydis*), northern corn leaf blight (*Setosphaeria turcica*), northern corn leaf spot (*Cochliobolus carbonum*), brown spot of corn (*Physoderma maydis*), rust of corn (*Puccinia* spp.), southern corn leaf blight (*Bipolaris maydis*), yellow leaf blight of corn (*Phyllosticta maydis*), stalk rot of corn (*Gibberella zeae*), sugar cane rust (*Puccinia* spp.), powdery mildew of cucurbits (*Sphaerotheca fuliginea*), anthracnose of cucurbits (*Colletotrichum lagenarium, Glomerella cingulata*), cucumber downy mildew (*Pseudoperonospora cubensis*), cucumber damping-off (*Phytophthora capsici*), *Fusarium* wilt of cucumber (*Fusarium oxysporum* f. sp. *cucumerinum*), *Fusarium* wilt of watermelon (*Fusarium oxysporum* f. sp. *niveum*), apple powdery mildew (*Podosphaera leucotricha*), apple black star (*Venturia inaequalis*), apple blossom blight (*Monilinia mali*), apple *alternaria* blotch (*Alternaria alternata* apple pathotype), apple rot (*Valsa mali*), pear black spot (*Alternaria alternata* pear pathotype), pear powdery mildew (*Phyllactinia pyri*), pear rust (*Gymnosporangium asiaticum*), pear scab (*Venturia nashicola*), strawberry powdery mildew (*Sphaerotheca humuli*), hstone fruits brown rot (*Monilinia fructicola*), citrus fruits blue mold (*Penicillium italicum*), grape powdery mildew (*Uncinula necator*), grape downy mildew (*Plasmopara viticola*), grape ripe rot (*Glomerella cingulata*), grape rust (*Phakopsora ampelopsidis*), black Sigatoka of banana (*Mycosphaerella fijiensis, Mycosphaerella musicola*), tomato powdery mildew (*Erysiphe cichoracearum*), tomato early blight (*Alternaria solani*), eggplant powdery mildew (*Erysiphe cichoracearum*), potato early blight (*Alternaria solani*), potato anthracnose (*Potatotrichum coccodes*), potato powdery mildew (*Erysiphe* spp, *Leveillula taurica*), potato late blight (*Phytophthora infestans*), tobacco powdery mildew (*Erysiphe cichoracearum*), tobacco brown spot (*Alternaria longipes*), *cercospora* leaf spot of beet (*Cercospora beticola*), sugar beet powdery mildew (*Erysiphe betae*), sugar beet rood rot (*Thanatephorus cucumeris*), *cercospora* leaf spot of beet (*Cercospora beticola*), sugar beet powdery mildew (*Erysiphe betae*), sugar beet leaf blight (*Thanatephorus cucumeris*), sugar beet root rot (*Thanatephorus cucumeris*), sugar beet black root rot (*Aphanomyces cochlioides*), *Fusarium* wilt of radish (*Fusarium oxysporum* f. sp. *raphani*), tea anthracnose (*Discula theae-sinensis*), tea blister blight (*Exobasidium vexans*), tea brown round spot (*Pseudocercospora ocellata, Cercospora chaae*), tea early blight (*Pestalotiopsis longiseta, Pestalotiopsis theae*), tea net blister blight (*Exobasidium reticulatum*), cotton *Alternaria* leaf spot (*Alternaria* spp.), cotton anthracnose (*Glomerella* spp.), cotton *Ascochyta* blight (*Ascochyta gossypii*), cotton rust (*Puccinia* spp, *Phykopsora* spp), cCercospora blight and leaf spot of cotton (*Cercospora* spp.), Diplopia boll rot of cotton (*Diplopia* spp), *Phoma* bright of cotton (*Phoma* spp), *Stemphylium* leaf spot of cotton (*Stemphyllium* spp), peanut late leaf spot (*Cercosporidium personatum*), peanut brown leaf spot (*Cercospora arachidicola*), peanut southern blight (*Sclerotium rolfsii*), peanut rust (*Puccinia arachidis*), yellow sigatoka of banana (*Mycosphaerella musicoka*), black sigatoka of banana (*Mycosphaerella fijiensis*), gray mold that affects various crops (*Botrytis cinerea*), diseases of *Pythium* (*Pythium* spp), and diseases of *Pythium* (*Sclerotinia sclerotiorum*). Examples also include seed-borne diseases or early-growth diseases of various plants caused by the genus *Aspergillus*, the genus *Cochliobolus*, the genus *Corticium*, the genus *Diplodia*, the genus *Penicillium*, the genus *Fusarium*, the genus *Gibberella*, the genus *Mucor*, the genus *Phoma*, the genus *Phomopsis*, the genus *Pyrenophora*, the genus *Pythium*, the genus *Rhizoctonia*, the genus *Rhizopus*, the genus *Thielabiopsis*, the genus *Tilletia*, the genus *Trichoderma*, and the genus *Ustilago*.

Among the above-mentioned diseases, the agricultural or horticultural fungicide in the present embodiment exhibits particularly excellent controlling effects against leaf rust of family of wheat such as wheat leaf blight and barley leaf rust. Accordingly, the agricultural or horticultural fungicide is advantageously used to control wheat, but is not limited to such application.

The agricultural or horticultural fungicide in the present embodiment can be used for all plants, and examples of applicable plants include the following. Poaceae such as rice, wheat, barley, rye, oat, triticale, corn, sorghum, sugar cane, turf, bentgrass, bermudagrass, fescue, and ryegrass; Legumes such as soybean, peanut, kidney bean, pea, adzuki bean, and alfalfa; Convolvulaceae such as sweet potato; Solanaceae such as *capsicum*, sweet pepper, tomato, eggplant, potato, and tobacco; Polygonaceae such as buckwheat; Asteraceae such as sunflower; Araliaceae such as ginseng; Brassicaceae such as rapeseed, Chinese cabbage, turnip, cabbage, and Japanese radish; Chenopodiaceae such as sugar beet; Malvaceae such as cotton; Rubiaceae such as coffee tree; Sterculiaceae such as cacao; Theaceae such as tea; Cucurbitaceae such as watermelon, melon, cucumber, and pumpkin; Liliaceae such as onion, leek, and garlic; Rosaceae such as strawberry, apple, almond, apricot, plum, yellow peach, Japanese plum, peach, and pear; Apiaceae such as carrot; Araceae such as taro; Larvae such as mango; Bromeliaceae such as pineapple; Caricaceae such as *papaya*; Ebenaceae such as persimmon; Ericaceae such as blueberry; Juglandaceae such as pecan; Musaceae such as banana; Oleaceae such as olive; Palmae such as coconut, and date; Rutaceae such as mandarin orange, orange, grapefruit, and lemon; Vitaceae such as grape; flowers and ornamental plants, trees other than fruit trees; and other ornamental plants. Other examples include wild plants, cultivars, plants and cultivars bred by known biological breeding such as hybridizing or plasmogamy, and genetically recombinant cultivars obtained by genetic engineering that have been approved in various countries. Examples of such genetically recombinant cultivars include those accumulated in the database of the International Service for the Acquisition of Agri-biotech Applications (ISAAA). Specific examples include those containing the trade names such as Roundup Ready, Liberty Link, IMI, SCS, Clearfield, Enlist, B.t., BXN, Poast Compatible, AgriSure, Genuity, Optimum, Powercore, DroughtGard, YieldGard, Herculex, WideStrike, Twinlink, VipCot, GlyTol, Newleaf, KnockOut, BiteGard, BtXtra, StarLink, Nucotn, NatureGard, Protecta, SmartStax, Power Core, InVigor, and Bollgard.

(2) Formulation

The agricultural or horticultural fungicide in the present embodiment may include the azole derivative (I) and other active ingredient. Therefore, examples of the fungicide include: (a) a formulation containing the azole derivative (I) and other active ingredient; and (b) a combination of a first preparation containing the azole derivative (I) and a second preparation containing other active ingredient, which are mixed immediately before use. Hereinafter, the form (a) is referred to as a "formulated agricultural or horticultural fungicide", and the form (b) is referred to as a "tank-mix agricultural or horticultural fungicide".

(2-1) Formulated Agricultural or Horticultural Fungicide

The content of the azole derivative (I) in the formulated agricultural or horticultural fungicide is, for example, from 0.1 to 95% by weight, preferably from 0.5 to 90% by weight, and more preferably from 2 to 80% by weight. The content of the azole derivative (I) in the spray liquid at the time of actual spraying is not particularly limited as long as it can exhibit the desired activity.

The azole derivative (I) included as an active ingredient in the formulated agricultural or horticultural fungicide may be a single compound or a mixture of two or more kinds of compounds.

The content of the other active ingredient in the formulated agricultural or horticultural fungicide is, for example, from 0.1 to 95% by weight, preferably from 0.5 to 90% by weight, and more preferably from 2 to 80% by weight. The content of the other active ingredient in the spray liquid at the time of actual spraying is not particularly limited as long as it can exhibit the desired activity. The formulated agricultural or horticultural fungicide includes the azole derivative (I) and other active ingredient, and may further include a solid carrier, a liquid carrier (diluent), a surfactant, or other formulation aid described below.

(2-2) Tank-Mix Agricultural or Horticultural Fungicide

The content of the azole derivative (I) and other active ingredient in the tank-mix agricultural or horticultural fungicide may be the same as the respective content in the above-mentioned formulated agricultural or horticultural fungicide. The first preparation including the azole derivative (I) for preparing tank-mix agricultural or horticultural fungicide may be in the similar form as the formulated agricultural or horticultural fungicide, except that it does not include other active ingredient. The second preparation including other active ingredient, which is used to prepare the tank-mix agricultural or horticultural fungicide, may be in the similar form as the formulated agricultural or horticultural fungicide, except that it does not include the azole derivative (I). The content of the azole derivative (I) in the first preparation and the content of the other active ingredient in the second preparation should be such that the content of the azole derivative (I) and the content of the other active ingredient in the final tank-mix agricultural or horticultural fungicide can be achieved.

The tank-mix agricultural or horticultural fungicide includes the azole derivative (I) and other active ingredient, and may further include a solid carrier, a liquid carrier (diluent), a surfactant, or other formulation aid described below.

The mixing ratio of the first preparation and the second preparation in the tank-mix agricultural or horticultural fungicide may be determined according to the composition and purpose of each preparation.

In the tank-mix agricultural or horticultural chemical, the first preparation containing the azole derivative (I) and the second preparation containing other active ingredient are prepared separately, and mixed together to prepare an agricultural or horticultural fungicide. Therefore, the scope of the present invention also includes a product for controlling plant diseases that is a combination preparation separately including the azole derivative (I) and other active ingredient, which are mixed before use for controlling plant diseases.

(2-3) Formulation Aid

The agricultural or horticultural fungicide is prepared by mixing the azole derivative (I) and other active ingredient with a solid or liquid carrier (diluent), a surfactant, and other formulation aid, and then formulated into various forms such as powders, wettable powders, granules, and emulsions. The fungicide may further include known biosurfactants as adjuvants, such as mannosyl alditol lipids, sophorolipids, rhamnolipids, trehalose lipids, cellobiose lipids, glucose lipids, oligosaccharide fatty acid esters, surfactin, seraetin, lycensin, and arsrofactin.

Examples of the solid carrier, liquid carrier, and surfactant used as formulation aids are as follows. First, examples of the solid carrier include powder carriers and granular carriers such as minerals such as clay, talc, diatomaceous earth, zeolite, montmorillonite, bentonite, acid clay, activated clay, attapulgite, calcite, vermiculite, perlite, pumice, and silica sand; synthetic organic materials such as urea; salts such as calcium carbonate, sodium carbonate, sodium sulphate, slaked lime, and baking soda; synthetic inorganic materials such as amorphous silica such as white carbon and titanium dioxide; plant carriers such as wood flour, corn stalk (cob), walnut shell (nut shell), fruit core, chaff, sawdust, bran, soy flour, powdered cellulose, starch, dextrin, and sugars; and various polymeric carriers such as crosslinked lignin, cation gel, gelatin gelated by heat or a polyvalent metal salt, water-soluble polymer gel such as agar, chlorinated polyethylene, chlorinated polypropylene, polyvinyl acetate, polyvinyl chloride, ethylene-vinyl acetate copolymer, and urea-aldehyde resin.

Examples of the liquid carrier include aliphatic solvents (paraffins), aromatic solvents (for example, xylene, alkylbenzene, alkylnaphthalene, and solvent naphtha), mixed solvents (kerosene), machine oils (refined high-boiling aliphatic hydrocarbons), alcohols (for example, methanol, ethanol, isopropanol, and cyclohexanol), polyhydric alcohols (for example, ethylene glycol, diethylene glycol, propylene glycol, hexylene glycol, polyethylene glycol, and polypropylene glycol), polyhydric alcohol derivatives (for example, propylene glycol ether), ketones (for example, acetone, acetophenone, cyclohexanone, methylcyclohexanone, and γ-butyrolactone), esters (fatty acid methyl ester (coconut oil fatty acid methyl ester), ethylhexyl lactate, propylene carbonate, dibasic acid methyl ester (succinic acid dimethyl ester, glutamic acid dimethyl ester, and adipic acid dimethyl ester)), nitrogen-containing carriers (N-alkylpyrrolidones), oils and fats (for example, coconut oil, soybean oil, and rapeseed oil), amide solvents [dimethylformamide, (N,N-dimethyloctaneamide, N,N-dimethyldecaneamide, 5-(dimethylamino)-2-methyl-5-oxo-valeric acid methyl ester, N-acylmorpholine-based solvents (for example, CAS NO. 887947-29-7)], dimethyl sulfoxide, acetonitrile, and water.

Examples of the nonionic surfactants include sorbitan fatty acid ester, polyoxyethylene sorbitan fatty acid ester, sucrose fatty acid ester, polyoxyethylene fatty acid ester, polyoxyethylene resin acid ester, polyoxyethylene fatty acid diester, polyoxyethylene alkyl ether, polyoxyethylene alkylphenyl ether, polyoxyethylene dialkyl phenyl ether, polyoxyethylene alkyl phenyl ether formalin condensate, polyoxyethylene/polyoxypropylene block polymer, alkyl polyoxyethylene/polyoxypropylene block polymer ether, polyoxyethylene alkylamine, polyoxyethylene fatty acid amide, polyoxyethylene fatty acid bisphenyl ether, polyoxyethylene benzylphenyl (or phenylphenyl) ether, polyoxyethylene styrylphenyl (or phenylphenyl) ether, polyoxyethylene ether and ester type silicone and fluorosurfactants, polyoxyethylene castor oil, polyoxyethylene hydrogenated castor oil, and alkyl glycosides. Examples of the anionic surfactants include salts of sulphates such as alkyl sulphate, polyoxyethylene alkyl ether sulphate, polyoxyethylene alkylphenyl ether sulphate, polyoxyethylene benzyl (or styryl) phenyl (or phenylphenyl) ether sulphate, polyoxyethylene, polyoxypropylene block polymer sulphate; salts of sulfonates such as paraffin (alkane) sulfonate, α-olefin sulfonate, dialkyl sulfosuccinate, alkylbenzene sulfonate, mono- or dialkyl naphthalene sulfonate, naphthalene sulfonate-formalin condensate, alkyl diphenyl ether disulfonate, lignin sulfonate, polyoxyethylene alkyl phenyl ether sulfonate, and polyoxyethylene alkyl ether sulfosuccinic acid half ester; salts of fatty acid such as fatty acids, N-methyl-fatty acid sarcosinates, and resin acids; salts of phosphates such as polyoxyethylene alkyl ether phosphate, polyoxyethylene mono- or dialkyl phenyl ether phosphate, polyoxyethylene benzyl (or styryl) phenyl (or phenylphenyl) ether phosphate, polyoxyethylene/polyoxypropylene block polymer, phosphatidylcholine phosphatidylethanolimine (lecithin), and alkyl phosphates. Examples of the cationic surfactants include ammonium salts such as alkyltrimethylammonium chloride, methylpolyoxyethylene alkylammonium chloride, alkyl N-methylpyridinium bromide, mono- or dialkylmethylated ammonium chloride, alkylpentamethylpropylenediamine dichloride; and benzalkonium salts such as alkyldimethylbenzalkonium chloride, and benzethonium chloride (octylphenoxyethoxyethyl dimethylbenzylammonium chloride).

Examples of the other formulation aid include inorganic salts used as pH adjusters such as sodium and potassium; fluorine-based and silicon-based defoamers; water-soluble salts such as common salt; water-soluble polymers used as thickeners such as xanthan gum, guar gum, carboxymethyl cellulose, polyvinylpyrrolidone, carboxyvinyl polymer, acrylic polymer, polyvinyl alcohol, starch derivatives and polysaccharides; alginic acid and salts thereof; metal stearates, sodium tripolyphosphate, sodium hexametaphosphate used as disintegrating dispersants; antiseptics; colorants; antioxidants; UV absorbers; and chemical damage reducers.

Some formulations are used as they are and some are diluted with a diluent such as water to a predetermined concentration before use. When diluted before use, the total concentration of the total active ingredients including the azole derivative (I) and other active ingredient is preferably from 0.001% to 1.0%.

The total amount of the active ingredients including the azole derivative (I) and other active ingredients is from 20 to 5000 g, more preferably from 50 to 2000 g per hectare of agricultural or horticultural area such as fields, rice paddies, orchards, and greenhouses. These concentrations and amounts can be increased or decreased without regard to the above ranges, as they depend on the formulation, time of use, method of use, location of use, and target crops.

[5. Method of Controlling Plant Diseases]

The agricultural or horticultural fungicides in the present embodiment can be used in agricultural or non-agricultural areas such as fields, paddy fields, lawns, and orchards. In addition, the agricultural or horticultural fungicide in the present embodiment can be applied not only by foliage treatment such as spraying foliage, but also by non-foliage treatment such as seed treatment including treatment of bulbs and tubers, soil-drenching treatment, and water surface treatment. Therefore, the method of controlling plant diseases of the present embodiment includes performing foliage treatment or non-foliage treatment using the agricultural or horticultural fungicide described above. When non-foliage treatment is performed, the amount of labor required can be reduced in comparison to when foliage treatment is performed.

In seed treatment, the chemical is applied to the seeds by mixing and stirring a wettable powder and a powder with the seeds, or by dipping the seeds in a diluted wettable powder. The seed treatment also includes seed coating treatment. The total amount of the active ingredients including the azole derivative (I) and other active ingredients in seed treatment is, for example, from 0.01 to 10,000 g, preferably from 0.1 to 1,000 g for 100 kg of seeds. Seeds treated with the agricultural or horticultural fungicide can be used in the same way as regular seeds.

The application by soil-drenching treatment is done by treating the planting hole or its surrounding area with granules, etc. at the time of seedling transplanting, or by treating the soil around the seed or plant body with, for example, granules or a wettable powder. The amount of active ingredients used in soil-drenching treatment is, for example, from 0.01 to 10,000 g and preferably from 0.1 to 1,000 g per 1 $m^2$ of agricultural or horticultural area.

In the case of application by water surface treatment, the water surface of a paddy field may be treated with granules or the like. The total amount of active ingredients used in water surface treatment is, for example, from 0.1 to 10,000 g, preferably from 1 to 1,000 g per 10 a of paddy field.

The total amount of active ingredients used for stem and leaf spraying is, for example, from 20 to 5,000 g, preferably from 50 to 2,000 g per hectare of agricultural or horticultural area such as fields, rice paddies, orchards, and greenhouses.

The concentration and amount of active ingredients used can be increased or decreased without regard to the above range, as it depends on the formulation, time of use, method of use, location of use, and target crops.

SUMMARY

As described above, the agricultural or horticultural fungicide of the present invention includes the azole derivative represented by the following general formula (I) as one of the active ingredients, and also includes other active ingredient.

[Chemical Formula 9]

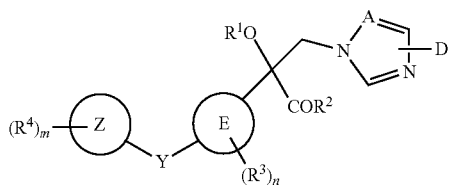

(I)

wherein
A is N or CH;
D is hydrogen, a halogen group, or $SR^D$; where $R^D$ is hydrogen, a cyano group, $C_1$-$C_6$-alkyl group, $C_1$-$C_6$-haloalkyl group, $C_2$-$C_6$-alkenyl group, $C_2$-$C_6$-haloalkenyl group, $C_2$-$C_6$-alkynyl group, or $C_2$-$C_6$-haloalkynyl group;
$R^1$ is hydrogen, a $C_1$-$C_6$-alkyl group, $C_2$-$C_6$-alkenyl group, $C_2$-$C_6$-alkynyl group, $C_3$-$C_8$-cycloalkyl group, $C_3$-$C_8$-cycloalkyl-$C_1$-$C_4$-alkyl group, phenyl group, phenyl-$C_1$-$C_4$-alkyl group, phenyl-$C_2$-$C_4$-alkenyl group, phenyl-$C_2$-$C_4$-alkynyl group, or $COXR^5$;
where $R^5$ is a hydrogen, $C_1$-$C_6$-alkyl group, $C_2$-$C_6$-alkenyl group, $C_2$-$C_6$-alkynyl group, $C_3$-$C_8$-cycloalkyl group, $C_3$-$C_8$-cycloalkyl-$C_1$-$C_4$-alkyl group, phenyl group, phenyl-$C_1$-$C_4$-alkyl group, phenyl-$C_2$-$C_4$-alkenyl group, or phenyl-$C_2$-$C_4$-alkynyl group;
X is a single bond, —O—, or —$NR^6$—;
$R^6$ is a hydrogen, $C_1$-$C_6$-alkyl group, $C_2$-$C_6$-alkenyl group, $C_2$-$C_6$-alkynyl group, $C_3$-$C_8$-cycloalkyl group, $C_3$-$C_8$-cycloalkyl-$C_1$-$C_4$-alkyl group, phenyl group, phenyl-$C_1$-$C_4$-alkyl group, phenyl-$C_2$-$C_4$-alkenyl group, or phenyl-$C_2$-$C_4$-alkynyl group, where $R^5$ and $R^6$ may form a ring;
$R^2$ is —$OR^7$ or —$NR^8R^9$;
$R^7$, $R^8$, and $R^9$ are each independently hydrogen, $C_1$-$C_6$-alkyl group, $C_2$-$C_6$-alkenyl group, $C_2$-$C_6$-alkynyl group, $C_3$-$C_8$-cycloalkyl group, C $C_8$-cycloalkyl group, $C_3$-$C_8$-cycloalkyl-$C_1$-$C_4$-alkyl group, phenyl group, phenyl-$C_1$-$C_4$-alkyl group, phenyl-$C_2$-$C_4$-alkenyl group, or phenyl-$C_2$-$C_4$-alkynyl group, where $R^8$ and $R^9$ may form a ring;
the aliphatic groups in $R^1$, $R^2$, $R^5$, $R^6$, $R^7$, $R^8$, and $R^9$ may have 1, 2, 3, or a maximum possible number of the same or different groups $R^a$s, $R^a$s are independently selected from a halogen group, cyano group, nitro group, $C_1$-$C_4$-alkoxy group, and $C_1$-$C_4$-haloalkoxy group;
$R^4$ is a halogen group, cyano group, nitro group, amino group, phenyl group, phenyl-oxy group, $C_1$-$C_4$-alkyl group, $C_1$-$C_4$-haloalkyl group, $C_1$-$C_4$-alkoxy group or $C_1$-$C_4$-haloalkoxy group, $C_1$-$C_4$-alkylamino group, $C_1$-$C_4$-dialkylamino group, $C_1$-$C_4$-alkylacylamino group, —$SOR^{10}$, or —$SF_5$;
the cycloalkyl group or phenyl moiety in $R^1$, $R^2$, $R^5$, $R^6$, $R^7$, $R^8$, and $R^9$ or the phenyl moiety in $R^4$ may have 1, 2, 3, 4, 5, or a maximum possible number of the same or different groups $R^b$s, where $R^b$ are independently selected from a halogen group, cyano group, nitro group, $C_1$-$C_4$-alkyl group, $C_1$-$C_4$-alkoxy group, $C_1$-$C_4$-haloalkyl group, and $C_1$-$C_4$-haloalkoxy group;
$R^3$ is a halogen group, cyano group, nitro group, phenyl group, phenyl-oxy group, $C_1$-$C_4$-alkyl group, $C_1$-$C_4$-haloalkyl group, $C_1$-$C_4$-alkoxy group, $C_1$-$C_4$-haloalkoxy group, —$SOR^{10}$, or —$SF_5$;
$R^{10}$ is a $C_1$-$C_4$-alkyl group or $C_1$-$C_4$-haloalkyl group;
E is a phenyl group or a 6-membered aromatic heterocyclic ring containing 1 or 2 N atoms;
n $R^3$s are bonded at any substitution positions;
when E is a phenyl group, n is 0, 1, 2, 3, or 4, when E is a 6-membered aromatic heterocyclic ring containing 1 or 2 N atoms, n is 0, 1, or 2;
Y is an oxygen atom, —$CH_2O$—, —$OCH_2$—, —NH—, —N(—$C_1$-$C_4$-alkyl)-, —N(—$C_3$-$C_6$-cycloalkyl)-, or —$S(O)_p$— bonded to any position of E;
p is 0, 1, or 2;
Z is an aromatic hydrocarbon group that is a phenyl or naphthyl group, a 5- or 6-membered aromatic heterocyclic ring containing 1 to 4 heteroatoms selected from O, N, or S, or a 9- or 10-membered aromatic heterocyclic ring consisting of two rings;
m $R^4$s are bonded at any substitution position; and
when Z is an aromatic hydrocarbon group, m is 1, 2, 3, 4, or 5, and when Z is an aromatic heterocyclic ring, m is 0, 1, 2, 3, or 4.

Furthermore, in the agricultural or horticultural fungicide according to the present invention, the other active ingredient preferably includes at least one selected from (i) a fungicide selected from nucleic acid synthesis and metabolism inhibitors, mitotic division/cell division inhibitors, respiratory inhibitors, amino acid/protein biosynthesis inhibitor, signal transduction inhibitors, lipid biosynthesis or transport/cell membrane structure or function inhibitors, cell membrane sterol biosynthesis inhibitors, cell wall biosynthesis inhibitors, melanin biosynthesis inhibitors, host plant resistance inducers, and multi-site fungicides;
  (ii) an insecticide selected from nicotinic acetylcholine receptor antagonizing modulators, sodium channel modulators, ryanodine receptor modulators, acetylcholinesterase inhibitors, oxidative phosphorylation uncouplers, and mitochondrial electron transport chain complex I inhibitors; and
  (iii) plant growth regulators.

In the agricultural or horticultural fungicide according to the present invention, the nucleic acid synthesis and metabolism inhibitor is preferably at least one selected from benalaxyl, benalaxyl-M, furalaxyl, ofurace, bupyrimate, dimethirimol, ethirimol, octhilinone, metalaxyl, metalaxyl-M, oxadixyl, and hymexazol.

In the agricultural or horticultural fungicide of the present invention, the mitotic division/mortor protein inhibitor is preferably at least one selected from benomyl, carbendazim, fuberidazole, thiabendazole, thiophanate, thiophanate-methyl, diethofencarb, zoxamide, ethaboxam, pencycuron, fluopicolide, phenamacril, metrafenone, and pyriofenone.

In the agricultural or horticultural fungicide of the present invention, the respiratory inhibitor is preferably at least one selected from tolfenpyrad, diflumetorim, fenazaquin, pydiflumetofen, fenfuram, carboxin, oxycarboxin, benodanyl, flutolanil, mepronil, isofetamid, benzovindiflupyr, bixafen, fluindapyr, fluxapyroxad, furametpyr, inpyrfluxam, isopyrazam, penflufen, penthiopyrad, sedaxane, isoflucypram, boscalid, fluopyram, thifluzamide, pyraziflumid, pyribencarb, fluoxastrobin, fenamidon, mandestrobin, azoxystrobin, coumoxystrobin, enoxastrobin, flufenoxystrobin, picoxystrobin, pyraclostrobin, pyraoxystrobin, triclopyricarb, famoxadone, dimoxystrobin, fenaminstrobin, metminostrobin, orysastrobin, kresoxim-methyl, trifloxystrobin, cyazofamid, amisulbrom, fenpicoxamid, florylpicoxamid, binapacryl, meptyldinocap, dinocap, fluazinam, triphenyltin acetate, triphenyltin chloride, triphenyltin hydroxide, silthiopham, ametoctradin, metyltetraprole, pyrapropoyne, and inpyrfluxam.

In the agricultural or horticultural fungicide of the present invention, the amino acid/protein biosynthesis inhibitor preferably includes at least one selected from cyprodinil, mepanipyrim, pyrimethanil, blasticidin, kasugamycin, streptomycin, and oxytetracycline.

In the agricultural or horticultural fungicide according to the present invention, the signal transduction inhibitor preferably includes at least one selected from quinoxyfen, proquinazid, chlozolinate, dimethachlon, fenpiclonil, fludioxonil, iprodione, procymidone, and vinclozolin.

In the agricultural or horticultural fungicide according to the present invention, the lipid biosynthesis or transport/cell membrane structure or function inhibitor is preferably at least one selected from isoprothiolan, edifenphos, iprobenfos (IBP), pyrazophos, biphenyl, chloroneb, dichloran, quintozen (PCNB), tecnazene (TCNB), tolclofos-methyl, etridiazole, prothiocarb, propamocarb, natamycin, oxathiapiprolin, and fluoxapiprolin.

In the agricultural or horticultural fungicide according to the present invention, the cell membrane sterol biosynthesis inhibitor is preferably at least one selected from imazalil, oxpoconazole, pefurazoate, prochloraz, triflumizole, triforine, pyrifenox, pyrisoxazole, fenarimol, nuarimol, azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, metconazole, ipconazole, myclobutanil, penconazole, propiconazole, simeconazole, tebuconazole, tetraconazole, triadimefon, triadimenol, triticonazole, mefentrifluconazole, prothioconazole, tridemorph, fenpropimorph, fenpropidin, piperaline, spiroxamine, fenpyrazamine, fenhexamid, naphthifine, terbinafine, pyributicarb, and ipfentrifluconazole.

In the agricultural or horticultural fungicide according to the present invention, the cell wall biosynthesis inhibitor is preferably at least one selected from polyoxin, dimethomorph, flumorph, pyrimorph, mandipropamid, benthiavalicarb, iprovalicarb, and valifenalate.

In the agricultural or horticultural fungicide according to the present invention, the melanin biosynthesis inhibitor is preferably at least one selected from fthalide, tricyclazole, pyrokyron, carpropamid, diclocymet, fenoxanil, and tolprocarb.

In the agricultural or horticultural fungicide according to the present invention, the host plant resistance inducer is preferably at least one selected from acibenzolar-S-methyl, probenazole, tiadinil, laminarin, isotianil, laminarin, fosetyl-Al, phosphorous acid, and phosphonates.

In the agricultural or horticultural fungicide according to the present invention, the multi-site fungicide is preferably at least one selected from cymoxanil, tecloftalam, triazoxide, flusulfamide, diclomezine, cyflufenamide, dodine, flutianil, ferimzone, tebufloquin, picarbutrazox, validamycin, mineral oil, baking soda, potassium carbonate, copper and copper compounds, sulfur, ferbam, mancozeb, maneb, metriram, propineb, thiram, zineb, ziram, captan, captafol, folpet, chlorothalonil (TPN), guazatin, iminoctadine acetate, iminoctadine albesilate, anilazine, dithianon, fluoroimide, methasulfocarb, florylpicoxamid, fluopimomide, ipflufenoquin, quinomethionate, pyridachlometyl, aminopyrifen, dichlobentiazox, quinofumelin, and dipymetitrone.

In the agricultural or horticultural fungicide according to the present invention, the nicotinic acetylcholine receptor antagonizing modulator is preferably at least one selected from acetamiprid, clothianidin, dinotefuran, imidacloprid, nitenpyram, thiacloprid, thiamethoxam, sulfoxaflor, flupyradifurone, and triflumezopyrim.

In the agricultural or horticultural fungicide according to the present invention, the sodium channel modulator is preferably at least one pyrethroid compound selected from acrinathrin, allethrin, cypermethrin, bifenthrin, cycloprothrin, cyhalothrin, cypermethrin, deltamethrin, dimefluthrin, esfenvalerate, etofenprox, fenpropathrin, fenvalerate, flubrocythrinate, flucythrinate, fluvalinate, halfenprox, cyhalothrin, metofluthrin, momfluorothrin, permethrin, profluthrin, tefluthrin, tralomethrin, cyfluthrin, bifenthrin, imiprothrin, pyrethrin, cyphenothrin, chloroprallethrin, epsilon-metofluthrin, and epsilon-momfluorothrin.

In the agricultural or horticultural fungicide according to the present invention, the ryanodine receptor modulator is preferably at least one selected from chlorantraniliprole, cyantraniliprole, flubendiamide, and cyhalodiamide.

In the agricultural or horticultural fungicide according to the present invention, the acetylcholinesterase inhibitor is preferably at least one selected from acephate, azinphosmethyl, cadusafos, chlorethoxyfos, chlorfenvinphos, chlorpyrifos, cyanophos, demeton-S-methyl, diazinon, dichlorvos (DDVP), dicrotophos, dimethoate, disulfoton, ethion, ethoprophos, EPN, fenamiphos, fenitrothion (MEP), fenthion (MPP), fosthiazate, imicyafos, isofenphos, isoxathion, malathion, methamidophos, methidathion, mevinphos, monocrotophos, omethoate, oxydemeton-methyl, parathion, parathion-methyl, phenthoate, phorate, phosalone, phosmet, phosphamidon, phoxim, pirimiphos-methyl, profenofos, prothiofos, pyraclofos, pyridaphenthion, quinalphos, tebupirimphos, terbufos, triazophos, trichlorfon (DEP), alanycarb, aldicarb, benfuracarb, BPMC, carbaryl (NAC), carbofuran, carbosulfan, cartap, fenoxycarb (BPMC), formetanate, isoprocarb (MIPC), methiocarb, methomyl, oxamyl, pirimicarb, thiodicarb, XMC, bendiocarb, ethiofencarb, fenobucarb, fenothiocarb, furathiocarb, metolcarb, and xylylcarb.

In the agricultural or horticultural fungicide according to the present invention, the oxidative phosphorylation uncoupler is preferably at least one selected from chlorfenapyr, DNOC, and sulfluramid.

In the agricultural or horticultural fungicide according to the present invention, the mitochondrial electron transport chain complex I inhibitor is preferably at least one selected from tebufenpyrad, tolfenpyrad, fenazaquin, fenpyroximate, pyridaben, pyrimidifen, and rotenone.

In the agricultural or horticultural fungicide according to the present invention, the plant growth regulator is preferably at least one selected from aminoethoxyvinylglycine, chlormequat, chlorpropham, cyclanilide, dikeglac, daminozide, ethephon, flurprimidol, flumetralin, forchlorfenuron, gibberellin, hydrazide maleate, mepiquat chloride, methylcyclopropene, benzylaminopurine, paclobutrazol, prohexadione, thidiazuron, tributylphosphorotrithioate, trinexapacethyl, and uniconazole.

The method of controlling plant diseases of the present invention comprises performing foliar treatment or non-foliar treatment using the agricultural or horticultural fungicide described above.

The product for controlling plant diseases according to the present invention is for preparing the above-mentioned agricultural or horticultural fungicide, and includes the azole derivative and another active ingredient listed above separately as a combination preparation to be mixed before use.

Examples are presented below to describe embodiments of the present invention in further detail. The present invention is of course not limited to the examples below, and it goes without saying that various aspects are possible for the details. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all documents described in the present specification are incorporated by reference.

Examples

Synthesis Example 1 Synthesis of Azole Derivative I-1

Synthesis of 2-(2-chloro-4-(4-chlorophenoxy)phenyl)-2-oxoacetic acid 761 mg of commercially available 1-(2-chloro-4-(4-chlorophenoxy)phenyl)-ethan-1-one and 10.8 mL of DMSO were added and dissolved in a 100 mL round-bottom flask, 2.21 g of iodine was added thereto, the temperature was raised to 100° C., and the mixture was stirred. After 3 hours from the start of the reaction, a saturated aqueous sodium sulfite solution was added to stop the reaction, and the mixture was extracted 3 times with toluene. The extract was washed 3 times with water and once with saturated brine. After drying over anhydrous sodium sulfate, the solvent was distilled off to obtain 181 mg of a crude orange liquid, but the desired product was not contained. The aqueous layer was acidified by adding a 1 N HCl solution, extracted 3 times with ethyl acetate, and washed once with saturated brine. After drying over anhydrous sodium sulfate, the solvent was distilled off to obtain 551.1 mg of the title compound as a crude white solid (yield 65.4%).

$^1$H NMR (400 MHz, DMSO-$d_6$) δ: 7.78 (d, J=8.4 Hz, 1H), 7.50 (d, J=8.8 Hz, 2H), 7.18 (d, J=8.8 Hz, 2H), 7.05 (d, J=2.4 Hz, 1H), 7.00 (dd, J=8.4, 2.4 Hz, 1H).

Synthesis of methyl 2-(2-chloro-4-(4-chlorophenoxy)phenyl)-2-oxoacetate 177 mg of 2-(2-chloro-4-(4-chlorophenoxy)phenyl)-2-oxoacetic acid and 1.1 mL of DMF were added and dissolved in a 100 mL round-bottom flask, 223 mg of cesium carbonate and 57 µL of methyl iodide were added thereto, and the mixture was stirred. One hour after the start of the reaction, a saturated aqueous ammonium chloride solution was added to stop the reaction, and the mixture was extracted 3 times with toluene. The extract was washed 3 times with water and once with saturated brine. After drying over anhydrous sodium sulfate, the solvent was distilled off to obtain 171.5 mg of a colorless liquid crude product of α-ketoester. This product was purified by column chromatography (5 g of silica gel, hexane:ethyl acetate=9:1) to obtain 161.4 mg (yield 87.1%) of the title compound as a colorless viscous liquid compound.

$^1$H NMR (400 MHz, CDCl$_3$) δ: 7.87 (d, J=8.7 Hz, 1H), 7.36 (d, J=8.9 Hz, 2H), 7.03-6.97 (m, 3H), 6.87 (dd, J=8.7, 2.5 Hz, 1H), 3.91 (s, 3H). $^{13}$C NMR (100 MHz, CDCl$_3$) δ: 165.3, 160.5, 153.6, 135.8, 133.4, 130.2, 129.7, 124.0, 121.5, 120.2, 119.8, 115.5, 52.3.

Synthesis of methyl 2-(2-chloro-4-(4-chlorophenoxy)phenyl)oxylan-2-carboxylate 130.4 mg of methyl 2-(2-chloro-4-(4-chlorophenoxy)phenyl)-2-oxoacetate, 68 µL of diiodomethane, and 1.0 mL of THF were added and dissolved in a 50 mL round-bottom flask, the mixture was cooled in a dry ice acetone bath, and 0.68 mL of isopropyl magnesium chloride was added and stirring was continued. After 0.5 hours from the start of the reaction, a saturated aqueous ammonium chloride solution was added to stop the reaction, and the mixture was extracted 3 times with ethyl acetate. The extract was washed once with water and once with saturated brine. After drying over anhydrous sodium sulfate, the solvent was distilled off to obtain 187.1 mg of a colorless liquid crude product of methyl 2-(2-chloro-4-(4-chlorophenoxy)phenyl)oxylan-2-carboxylate. The product was purified by column chromatography (6 g of silica gel, hexane:ethyl acetate=9:1) to obtain 91.6 mg of a colorless viscous liquid of the title compound.

Synthesis of methyl 2-hydroxy-2-(2-chloro-4-(4-chlorophenoxy)phenyl)-3-(1H-1,2,4-triazole-1-yl)propanoate (I-1)

91.6 mg of methyl 2-(2-chloro-4-(4-chlorophenoxy)phenyl)oxiran-2-carboxylate and 1.2 mL of DMF were added and dissolved in a 100 mL round-bottom flask, 43.7 mg of triazole sodium salt was added thereto, the temperature was raised to 40° C., and the mixture was stirred. The reaction was appropriately sampled and followed by HPLC. After 4 hours from the start of the reaction, a saturated aqueous ammonium chloride solution was added to stop the reaction, and the mixture was extracted 3 times with toluene. The extract was washed 3 times with water and once with saturated brine. After drying over anhydrous sodium sulfate, the solvent was distilled off to obtain 187 mg of a colorless liquid crude product. The product was purified by column chromatography (2 g of silica gel, hexane:ethyl acetate=1:1) to obtain 27.0 mg of a colorless viscous liquid mixture. This was crystallized in toluene to obtain 12.8 mg of a white solid of the azole derivative I-1 represented by the general formula (Ia) in which $R^2$ is methoxy (OMe), $(R^3)_n$ is 2-chloro, and $(R^4)_m$ is 4-chloro.

$^1$H NMR (400 MHz, CDCl$_3$) δ: 8.00 (s, 1H), 7.88 (s, 1H), 7.40 (d, J=8.8 Hz, 1H), 7.34 (d, J=8.7 Hz, 2H), 6.99-6.95 (m, 3H), 6.81 (dd, J=8.8 Hz, 1H), 5.0 (d, J=14.3 Hz, 1H), 4.93 (d, J=14.3 Hz, 1H), 4.88 (br, 1H), 3.80 (s, 3H).

Synthesis Example 2 Synthesis of Other Azole Derivative

The azole derivatives I-23, I-122, and I-228 were synthesized by appropriately changing the compounds used and the conditions in Synthesis Example 1 described above.

TEST EXAMPLE 1: CONTROLLING EFFECT TEST AGAINST WHEAT LEAF RUST USING AZOLE DERIVATIVE I-1 AND FUNGICIDE AZOXYSTROBIN AS RESPIRATORY INHIBITOR

In the present test example, the controlling effect of the mixture of the azole derivative I-1 and azoxystrobin against wheat leaf rust (*Puccinia recondita*) was tested.

A chemical solution containing only the azole derivative I-1, azoxystrobin, or azole derivative I-1 and azoxystrobin was diluted and suspended in water to a predetermined concentration and sprayed at a rate of 1,000 L/ha, and sprayed over young seedlings at the second leaf stage (variety: No. 61, three pots per treated area) grown in square plastic pots (6 cm×6 cm). After leaving the sprayed leaves at room temperature for about 1 hour to air dry, the plants were spray-inoculated with a suspension of fungal summer spores ($1 \times 10^5$ spores/mL) collected from wheat leaves affected by wheat leaf rust, and kept in a thermostatic chamber at 20° C. for 15 hours. Then, the plants were transferred to a glass greenhouse and grown, and 14 days later, the degree of onset was examined using the disease index based on the "Standards for different degrees of disease of wheat rust and small rust" of the Japan Plant Protection Association. The test scale was 3 pots per treated area. As a control, the same suspension of *Puccinia recondita* as above was sprayed and inoculated without spraying a chemical solution, and the controlling rate was calculated by the following formula.

Controlling rate (%)=(1−average incidence rate in chemical-treated area/average incidence rate in untreated area)×100

Next, the synergistic effect of the two types of the compounds was determined by the method using Colby formula (formula described below).

Controlling rate when mixed and sprayed(theoretical value)=α+((100−α)×β)/100

The results are shown in Table 2. In the above formula, α and β represent the controlling rate when each compound is sprayed alone.

As shown in Table 2, the controlling rate of the mixture of the azole derivative I-1 and azoxystrobin was larger than the theoretical value calculated from the controlling rate when each was sprayed alone, indicating the synergistic effect of the azole derivative I-1 and azoxystrobin.

TABLE 2

Effect of mixing azole derivative and azoxystrobin on wheat leaf rust

| Azole derivative I-1 g/ha | Azoxystrobin g/ha | Actual controlling rate | Expected controlling rate |
|---|---|---|---|
| 2.5 | 1.25 | 99 | 91 |
| 1.25 | 1.25 | 76 | 68 |
| 0.63 | 1.25 | 72 | 55 |
| 0 | 1.25 | 47 | |
| 2.5 | 0 | 83 | |
| 1.25 | 0 | 40 | |
| 0.63 | 0 | 16 | |
| 0 | 0 | 0 | |

Test Example 2: Controlling Effect Test Against Wheat Leaf Rust Using Azole Derivative I-1 and Fungicidal Pydiflumetofen as Respiratory Inhibitor In the present test example, the controlling effect of the mixture of the azole derivative I-1 and pydiflumetofen against wheat leaf rust was tested.

The test method, evaluation method, and others are the same as in Test Example 1 above, except that the composition of the chemicals was changed as shown in Table 3. The results are shown in Table 3.

As shown in Table 3, the controlling rate of the mixture of the azole derivative I-1 and pydiflumetofen was larger than the theoretical value calculated from the controlling rate when each chemical was sprayed alone, indicating the synergistic effect of the azole derivative I-1 and pydiflumetofen.

TABLE 3

Effect of mixing azole derivative and pydiflumetofen on wheat leaf rust

| Azole derivative I-1 g/ha | Pydiflumetofen g/ha | Actual controlling rate | Expected controlling rate |
|---|---|---|---|
| 1.25 | 10 | 100 | 94 |
| 0.63 | 10 | 98 | 85 |
| 0 | 10 | 83 | |
| 1.25 | 5 | 99 | 89 |
| 0.63 | 5 | 94 | 70 |
| 0 | 5 | 67 | |
| 1.25 | 2.5 | 94 | 81 |
| 0.63 | 2.5 | 67 | 51 |
| 0 | 2.5 | 44 | |
| 1.25 | 1.25 | 98 | 81 |
| 0.63 | 1.25 | 83 | 51 |
| 0 | 1.25 | 44 | |
| 1.25 | 0.63 | 96 | 70 |
| 0.63 | 0.63 | 83 | 21 |
| 0 | 0.63 | 11 | |
| 2.5 | 0 | 98 | |
| 1.25 | 0 | 67 | |
| 0.63 | 0 | 11 | |
| 0 | 0 | 0 | |

Test Example 3: In Vitro Antimicrobial Activity Test Using Azole Derivative I-1 and Carbendazim In the present Test Example, the antimicrobial activity of a mixed formulation of the azole derivative I-1 and carbendazim against *Pyrenophola teres* was tested.

The azole derivative I-1 alone, carbendazim alone, or a combination of the azole derivative I-1 and carbendazim were mixed in PDA medium (potato-dextrose-agar medium) to a predetermined concentration, thus preparing the plate media containing the chemicals. Apart from this, *Pyrenophola teres* pre-cultivated on chemical-free plate media was punched out with a 4-mm diameter cork borer and inoculated on chemical-containing PDA plate media. After three days of incubation at 25° C., the diameter of the growing colonies was measured and compared with the colony diameter on the chemical-free medium to obtain the fungal growth inhibition rate using the following formula:

$R=100(dc-dt)/dc$

In the above formula, R represents the fungal growth inhibition rate (%), dc represents the colony diameter on the chemical-free plate, and dt represents the colony diameter on the chemical-containing plate. Next, the synergistic effect of the two types of the compounds was determined by the method using Colby formula (formula described below).

Inhibition rate when mixed for use(theoretical value)
=α+((100−α)×β)/100

In the above formula, α and β represent the inhibition rate when each compound is used alone. The results are shown in Table 4.

As shown in Table 4, the fungal growth inhibition rate by the mixture of the azole derivative I-1 and carbendazim was greater than the theoretical value calculated from the inhibition rate when each was used alone, indicating the synergistic effect of the azole derivative I-1 and carbendazim.

TABLE 4

Antimicrobial activity of each compound against *Pyrenophola teres*

| Azole derivative I-1 ppm | Carbendazim ppm | Actual fungal growth inhibition rate (%) % | Expected fungal growth inhibition rate (%) % |
|---|---|---|---|
| 0.25 | 40 | 73 | 55 |
| 0.25 | 10 | 71 | 55 |
| 0.25 | 2.5 | 68 | 51 |
| 0.25 | 0.625 | 65 | 48 |
| 0 | 40 | 14 | |
| 0 | 10 | 13 | |
| 0 | 2.5 | 6 | |
| 0 | 0.625 | 0 | |
| 0.25 | 0 | 48 | |

Test Example 4: In Vitro Antimicrobial Activity Test Using Azole Derivative I-1 and Penthiopyrad In the present test example, the antimicrobial activity of a mixed formulation of the azole derivative I-1 and penthiopyrad against *Fusarium graminearum* s. str. was tested.

The test method, evaluation method, and others are the same as in Test Example 3 above, except that the composition of the chemicals was changed as shown in Table 3. The results are shown in Table 5.

As shown in Table 5, the fungal growth inhibition rate of the mixture of the azole derivative I-1 and penthiopyrad was larger than the theoretical value calculated from the inhibition rate when each chemical was used alone, indicating the synergistic effect of the azole derivative I-1 and penthiopyrad.

TABLE 5

Antimicrobial activity of each compound on *Fusarium graminearum*

| Azole derivative I-1 ppm | Penthiopyrad ppm | Actual fungal growth inhibition rate (%) % | Expected fungal growth inhibition rate (%) % |
|---|---|---|---|
| 0.25 | 20 | 38 | 28 |
| 0.25 | 5 | 45 | 22 |
| 0.25 | 1.25 | 46 | 7 |
| 0 | 20 | 28 | |
| 0 | 5 | 22 | |
| 0 | 1.25 | 7 | |
| 0.25 | 0 | 0 | |

Test Examples 5 to 22: In Vitro Antimicrobial Activity Test Using Azole Derivative I-1 and Other Fungicides In the present test example, the antimicrobial activity of a mixed formulation of the azole derivative I-1 and other fungicides (trifloxystrobin, fluoxastrobin, fluopyram, bixafen, spiroxamine, prothioconazole, mefentrifluconazole, metyltetraprole, and metconazole) against plant pathogenic fungus (*Pyrenophora graminea, Gaeumannomyces graminis, Alternaria alternata* apple pathotype, *Fusarium fujikuroi*, and *Glomerella cingulata*) listed in the following tables was tested.

The test method, evaluation method, and others are the same as those in Test Example 3 above, except that the composition of the chemical to be mixed with the azole derivative I-1 was changed and the fungi species was changed. The results are shown in Tables 6 to 23.

As shown in Tables 6 to 23, the fungal growth inhibition rate of the mixture of the azole derivative I-1 and trifloxystrobin, fluoxastrobin, fluopyram, bixafen, spiroxamine, prothioconazole, mefentrifluconazole, metyltetraprole, or metconazole was larger than the theoretical value calculated from the inhibition rate when each chemical was used alone, indicating the synergistic effect of the azole derivative I-1 and these fungicides.

TABLE 6

Antimicrobial activity of each compound on *Pyrenophora graminea*

| Azole derivative I-1 Ppm | Trifloxystrobin ppm | Actual fungal growth inhibition rate (%) % | Expected fungal growth inhibition rate (%) % |
|---|---|---|---|
| 0.50 | 0 | 94 | |
| 0.13 | 0 | 81 | |
| 0.03 | 0 | 71 | |
| 0 | 0.50 | 54 | |
| 0.50 | 0.50 | 100 | 97 |
| 0.13 | 0.50 | 99 | 91 |
| 0.03 | 0.50 | 90 | 86 |

TABLE 7

Antimicrobial activity of each compound on *Gaeumannomyces graminis*

| Azole derivative 1-1 ppm | Trifloxystrobin ppm | Actual fungal growth inhibition rate (%) % | Expected fungal growth inhibition rate (%) % |
|---|---|---|---|
| 0.03 | 0 | 31 | |
| 0 | 0.50 | 15 | |
| 0.03 | 0.50 | 47 | 42 |
| 0 | 0.002 | 8 | |
| 0.03 | 0.002 | 54 | 36 |

TABLE 8

Antimicrobial activity of each compound on *Alternaria alternata* apple pathotype

| Azole derivative I-1 ppm | Trifloxystrobin ppm | Actual fungal growth inhibition rate (%) % | Expected fungal growth inhibition rate (%) % |
|---|---|---|---|
| 0.03 | 0 | 0 | |
| 0.01 | 0 | 0 | |
| 0 | 0.13 | 48 | |
| 0.03 | 0.13 | 59 | 48 |
| 0.01 | 0.13 | 50 | 48 |

TABLE 9

Antimicrobial activity of each compound on *Pyrenophora graminea*

| Azole derivative I-1 ppm | Fluoxastrobin ppm | Actual fungal growth inhibition rate (%) % | Expected fungal growth inhibition rate (%) % |
|---|---|---|---|
| 0.50 | 0 | 95 | |
| 0.13 | 0 | 80 | |
| 0.03 | 0 | 70 | |
| 0 | 0.50 | 55 | |
| 0.50 | 0.50 | 100 | 98 |
| 0.13 | 0.50 | 98 | 91 |
| 0.03 | 0.50 | 88 | 86 |

TABLE 10

Antimicrobial activity of each compound on *Gaeumannomyces graminis*

| Azole derivative I-1 ppm | Fluoxastrobin ppm | Actual fungal growth inhibition rate (%) % | Expected fungal growth inhibition rate (%) % |
|---|---|---|---|
| 0.03 | 0 | 28 | |
| 0 | 0.01 | 0 | |
| 0.03 | 0.01 | 41 | 28 |

TABLE 11

Antimicrobial activity of each compound on *Alternaria alternata* apple pathotype

| Azole derivative I-1 Ppm | Fluoxastrobin Ppm | Actual fungal growth inhibition rate (%) % | Expected fungal growth inhibition rate (%) % |
|---|---|---|---|
| 0.13 | 0 | 1 | |
| 0.03 | 0 | 0 | |
| 0.01 | 0 | 0 | |
| 0 | 0.13 | 48 | |
| 0.13 | 0.13 | 54 | 48 |
| 0.03 | 0.13 | 56 | 48 |
| 0.01 | 0.13 | 51 | 48 |

TABLE 12

Antimicrobial activity of each compound on *Fusarium fujikuroi*

| Azole derivative I-1 ppm | Fluopyram ppm | Actual fungal growth inhibition rate (%) % | Expected fungal growth inhibition rate (%) % |
|---|---|---|---|
| 0.50 | 0 | 59 | |
| 0 | 0.50 | 21 | |
| 0.50 | 0.50 | 70 | 67 |
| 0 | 0.03 | 6 | |
| 0.50 | 0.03 | 73 | 61 |

TABLE 13

Antimicrobial activity of each compound on *Glomerella cingulata*

| Azole derivative I-1 ppm | Fluopyram ppm | Actual fungal growth inhibition rate (%) % | Expected fungal growth inhibition rate (%) % |
|---|---|---|---|
| 0.50 | 0 | 77 | |
| 0 | 0.50 | 9 | |
| 0.50 | 0.50 | 87 | 79 |
| 0 | 0.13 | 3 | |
| 0.50 | 0.13 | 86 | 78 |

TABLE 14

Antimicrobial activity of each compound on *Fusarium fujikuroi*

| Azole derivative I-1 ppm | Bixafen ppm | Actual fungal growth inhibition rate (%) % | Expected fungal growth inhibition rate (%) % |
|---|---|---|---|
| 0.03 | 0 | 4 | |
| 0.01 | 0 | 0 | |
| 0 | 0.50 | 19 | |
| 0.03 | 0.50 | 37 | 22 |
| 0.01 | 0.50 | 28 | 19 |
| 0 | 0.13 | 13 | |
| 0.03 | 0.13 | 30 | 16 |
| 0.01 | 0.13 | 30 | 13 |

TABLE 15

Antimicrobial activity of each compound on *Alternaria alternata* apple pathotype

| Azole derivative I-1 ppm | Bixafen ppm | Actual fungal growth inhibition rate (%) % | Expected fungal growth inhibition rate (%) % |
|---|---|---|---|
| 0.13 | 0 | 0 | |
| 0.03 | 0 | 0 | |
| 0.01 | 0 | 0 | |
| 0 | 0.03 | 14 | |
| 0.13 | 0.03 | 24 | 14 |
| 0.03 | 0.03 | 24 | 14 |
| 0.01 | 0.03 | 28 | 14 |

TABLE 16

Antimicrobial activity of each compound on *Pyrenophora graminea*

| Azole derivative I-1 ppm | Spiroxamine ppm | Actual fungal growth inhibition rate (%) % | Expected fungal growth inhibition rate (%) % |
|---|---|---|---|
| 0.50 | 0 | 93 | |
| 0.13 | 0 | 57 | |
| 0 | 0.03 | 0 | |
| 0.50 | 0.03 | 97 | 93 |
| 0.13 | 0.03 | 66 | 57 |
| 0 | 0.01 | 0 | |
| 0.50 | 0.01 | 100 | 93 |
| 0.13 | 0.01 | 73 | 57 |

TABLE 17

Antimicrobial activity of each compound on *Gaeumannomyces graminis*

| Azole derivative I-1 ppm | Spiroxamine ppm | Actual fungal growth inhibition rate (%) % | Expected fungal growth inhibition rate (%) % |
|---|---|---|---|
| 0.13 | 0 | 94 | |
| 0 | 0.13 | 0 | |
| 0.13 | 0.13 | 96 | 94 |
| 0 | 0.002 | 0 | |
| 0.13 | 0.002 | 98 | 94 |

TABLE 18

Antimicrobial activity of each compound on *Pyrenophora graminea*

| Azole derivative I-1 ppm | Prothioconazole ppm | Actual fungal growth inhibition rate (%) % | Expected fungal growth inhibition rate (%) % |
|---|---|---|---|
| 0.50 | 0 | 94 | |
| 0.13 | 0 | 81 | |
| 0.03 | 0 | 71 | |
| 0 | 0.50 | 54 | |
| 0.50 | 0.50 | 100 | 97 |
| 0.13 | 0.50 | 99 | 91 |
| 0.03 | 0.50 | 90 | 86 |

TABLE 19

Antimicrobial activity of each compound on *Alternaria alternata* apple pathotype

| Azole derivative I-1 ppm | Prothioconazole ppm | Actual fungal growth inhibition rate (%) % | Expected fungal growth inhibition rate (%) % |
|---|---|---|---|
| 0.03 | 0 | 0 | |
| 0 | 0.13 | 48 | |
| 0.03 | 0.13 | 59 | 48 |

TABLE 20

Antimicrobial activity of each compound on *Gaeumannomyces graminis*

| Azole derivative I-1 ppm | Mefentrifluconazole ppm | Actual fungal growth inhibition rate (%) % | Expected fungal growth inhibition rate (%) % |
|---|---|---|---|
| 0.13 | 0 | 93 | |
| 0.03 | 0 | 28 | |
| 0 | 0.01 | 0 | |
| 0.13 | 0.01 | 98 | 93 |
| 0.03 | 0.01 | 42 | 28 |
| 0 | 0.002 | 0 | |
| 0.13 | 0.002 | 98 | 93 |
| 0.03 | 0.002 | 34 | 28 |

TABLE 21

Antimicrobial activity of each compound on *Glomerella cingulata*

| Azole derivative I-1 ppm | Mefentrifluconazole ppm | Actual fungal growth inhibition rate (%) % | Expected fungal growth inhibition rate (%) % |
|---|---|---|---|
| 0.50 | 0 | 75 | |
| 0.13 | 0 | 49 | |
| 0 | 0.03 | 41 | |
| 0.50 | 0.03 | 89 | 86 |
| 0.13 | 0.03 | 81 | 70 |
| 0 | 0.01 | 17 | |
| 0.50 | 0.01 | 86 | 79 |
| 0.13 | 0.01 | 67 | 57 |

TABLE 22

Antimicrobial activity of each compound on *Pyrenophora graminea*

| Azole derivative I-1 ppm | Metyltetraprole ppm | Actual fungal growth inhibition rate (%) % | Expected fungal growth inhibition rate (%) % |
|---|---|---|---|
| 0.13 | 0 | 82 | |
| 0.03 | 0 | 68 | |
| 0.01 | 0 | 37 | |
| 0 | 0.001 | 0 | |
| 0.13 | 0.001 | 86 | 82 |
| 0.03 | 0.001 | 77 | 68 |
| 0.01 | 0.001 | 43 | 37 |

TABLE 23

Antimicrobial activity of each compound on *Glomerella cingulata*

| Azole derivative I-1 ppm | Metconazole ppm | Actual fungal growth inhibition rate (%) % | Expected fungal growth inhibition rate (%) % |
|---|---|---|---|
| 0.03 | 0 | 9 | |
| 0.01 | 0 | 0 | |
| 0 | 0.01 | 28 | |
| 0.03 | 0.01 | 47 | 32 |
| 0.01 | 0.01 | 33 | 24 |
| 0 | 0.003 | 7 | |
| 0.03 | 0.003 | 31 | 15 |
| 0.01 | 0.003 | 7 | 6 |
| 0 | 0.001 | 4 | |
| 0.03 | 0.001 | 23 | 13 |
| 0.01 | 0.001 | 7 | 4 |

Test Examples 23 to 26: In Vitro Antimicrobial Activity Test Using Azole Derivative I-1 and Other Fungicides In the present test example, the antimicrobial activity of mixed formulations of the azole derivative I-1 and other fungicides (isoflucypram, fenpicoxamid, and metyltetraprole) against the plant pathogenic fungus (*Cercospora beticola* and *Colletotrichum lindemuthianum*) listed in the tables below was tested.

The azole derivative I-1 alone, the other fungicide (isoflucypram, fenpicoxamid, or metyltetraprole) alone, or a combination of the azole derivative I-1 and other fungicide (isoflucypram, fenpicoxamid, or metyltetraprole) at predetermined concentrations were dissolved in methanol and a surfactant (alkyl allyl polyglycol ether). 10 μL of each solution was dropped into each well of a 96-well microplate, and the solvent was dried in a hood. 100 μL of potato-dextrose medium and a suspension of spores or mycelia of plant pathogenic fungus (*Cercospora beticola* or *Colletotrichum lindemuthianum*) were added to each well, mixed, and incubated at 20° C. and 85% humidity. After 3 to 5 days of incubation, the absorbance of each well was measured at a wavelength of 620 nm. The absorbance was compared with that of the wells containing a chemical-free medium, and the growth inhibition rate was determined by the following formula:

$$R'=100(dc'-dt')/dc'$$

In the above formula, R' represents the growth inhibition rate (%), dc' represents the absorbance of the chemical-free well, and dt' represents the absorbance of the chemical-containing well. Next, the synergistic effect of the two compounds was determined in the same manner as in Test Example 3 by the method using Colby formula. When the growth is equal to or higher than the growth of the fungus in the chemical-free medium, the inhibition rate is 0%, and when no growth is observed, the inhibition rate is 100%. The results are shown in Tables 24 to 27.

As shown in Tables 24 to 27, the growth inhibition rate of the mixture of the azole derivative I-1 and isoflucypram, fenpicoxamide, or metyltetraprole was larger than the theoretical value calculated from the growth inhibition rate when each chemical was used alone, indicating the synergistic effect of the azole derivative I-1 and these fungicides.

TABLE 24

Antimicrobial activity of each compound on *Cercospora beticola*

| Azole derivative I-1 ppm | Isoflucypram ppm | Actual growth inhibition rate % | Expected growth inhibition rate % |
|---|---|---|---|
| 0.5 | 0 | 6 | |
| 0 | 1.0 | 48 | |
| 0.5 | 1.0 | 52 | 51 |
| 0 | 0.2 | 0 | |
| 0.5 | 0.2 | 7 | 6 |
| 0 | 0.04 | 3 | |
| 0.5 | 0.04 | 35 | 8 |
| 0 | 0.008 | 7 | |
| 0.5 | 0.008 | 19 | 13 |

TABLE 25

Antimicrobial activity of each compound on *Cercospora beticola*

| Azole derivative I-1 ppm | Fenpicoxamid ppm | Actual growth inhibition rate % | Expected growth inhibition rate % |
|---|---|---|---|
| 2.5 | 0 | 99 | |
| 0.02 | 0 | 0 | |
| 0 | 5.0 | 100 | |
| 2.5 | 5.0 | 100 | 100 |
| 0.02 | 5.0 | 100 | 100 |
| 0 | 1.0 | 60 | |
| 2.5 | 1.0 | 100 | 99 |
| 0.02 | 1.0 | 71 | 60 |
| 0 | 0.2 | 59 | |
| 2.5 | 0.2 | 100 | 99 |
| 0.02 | 0.2 | 59 | 59 |
| 0 | 0.04 | 28 | |

TABLE 25-continued

Antimicrobial activity of each compound on *Cercospora beticola*

| Azole derivative I-1 ppm | Fenpicoxamid ppm | Actual growth inhibition rate % | Expected growth inhibition rate % |
|---|---|---|---|
| 2.5 | 0.04 | 100 | 99 |
| 0.02 | 0.04 | 42 | 28 |

TABLE 26

Antimicrobial activity of each compound on *Cercospora beticola*

| Azole derivative I-1 ppm | Metyltetraprole ppm | Actual growth inhibition rate % | Expected growth inhibition rate % |
|---|---|---|---|
| 0.02 | 0 | 0 | |
| 0 | 0.08 | 72 | |
| 0.02 | 0.08 | 95 | 72 |

TABLE 27

Antimicrobial activity of each compound on *Colletotrichum lindemuthianum*

| Azole derivative I-1 ppm | Metyltetraprole ppm | Actual growth inhibition rate % | Expected growth inhibition rate % |
|---|---|---|---|
| 0.10 | 0 | 0 | |
| 0 | 2.0 | 91 | |
| 0.1 | 2.0 | 98 | 91 |
| 0 | 0.4 | 73 | |
| 0.1 | 0.4 | 75 | 73 |
| 0 | 0.08 | 6 | |
| 0.1 | 0.08 | 31 | 6 |

Test Examples 27 to 38: In Vitro Antimicrobial Activity Test Using Azole Derivative I-23 and Other Fungicides In the present test example, the antimicrobial activity of a mixed formulation of the azole derivative I-23 and other fungicides (bixafen, fluxapyroxad, trifloxystrobin, fluoxastrobin, prothioconazole, and mefentrifluconazole) against plant pathogenic fungus (*Pyrenophora graminea, Fusarium graminearum, Gaeumannomyces graminis, Penicillium italicum, Glomerella cingulata, Microdocum nivale*, and *Alternaria alternata* apple pathotype) listed in the following tables was tested.

The test method, evaluation method, and others are the same as those in Test Example 3 above, except that the composition of the chemical to be mixed with the azole derivative I-23 was changed and the fungi species was changed. The results are shown in Tables 28 to 39.

As shown in Tables 28 to 39, the fungal growth inhibition rate of the mixture of the azole derivative I-23 and bixafen, fluxapyroxad, trifloxystrobin, fluoxastrobin, prothioconazole, or mefentrifluconazole was larger than the theoretical value calculated from the inhibition rate when each chemical was used alone, indicating the synergistic effect of the azole derivative I-23 and these fungicides.

TABLE 28

Antimicrobial activity of each compound on *Pyrenophora graminea*

| Azole derivative I-23 ppm | Bixafen ppm | Actual fungal growth inhibition rate (%) % | Expected fungal growth inhibition rate (%) % |
|---|---|---|---|
| 1.25 | 0 | 95 | |
| 0.31 | 0 | 92 | |
| 0.08 | 0 | 73 | |
| 0 | 1.56 | 75 | |
| 1.25 | 1.56 | 100 | 99 |
| 0.31 | 1.56 | 100 | 98 |
| 0.08 | 1.56 | 100 | 93 |

TABLE 29

Antimicrobial activity of each compound on *Fusarium graminearum*

| Azole derivative I-23 ppm | Bixafen ppm | Actual fungal growth inhibition rate (%) % | Expected fungal growth inhibition rate (%) % |
|---|---|---|---|
| 5.00 | 0 | 79 | |
| 0 | 0.10 | 6 | |
| 5.00 | 0.10 | 87 | 80 |

TABLE 30

Antimicrobial activity of each compound on *Gaeumannomyces graminis*

| Azole derivative I-23 ppm | Fluxapyroxad ppm | Actual fungal growth inhibition rate (%) % | Expected fungal growth inhibition rate (%) % |
|---|---|---|---|
| 5.00 | 0 | 94 | |
| 0.08 | 0 | 92 | |
| 0 | 1.56 | 0 | |
| 5.00 | 1.56 | 97 | 94 |
| 0.08 | 1.56 | 97 | 92 |

TABLE 31

Antimicrobial activity of each compound on *Penicillium italicum*

| Azole derivative I-23 ppm | Trifloxystrobin ppm | Actual fungal growth inhibition rate (%) % | Expected fungal growth inhibition rate (%) % |
|---|---|---|---|
| 0.50 | 0 | 52 | |
| 0.13 | 0 | 35 | |
| 0.03 | 0 | 12 | |
| 0.01 | 0 | 6 | |
| 0 | 0.50 | 90 | |
| 0.50 | 0.50 | 97 | 95 |
| 0.13 | 0.50 | 97 | 94 |
| 0.03 | 0.50 | 94 | 92 |
| 0.01 | 0.50 | 95 | 91 |

TABLE 32

Antimicrobial activity of each compound on *Glomerella cingulata*

| Azole derivative I-23 ppm | Trifloxystrobin ppm | Actual fungal growth inhibition rate (%) % | Expected fungal growth inhibition rate (%) % |
|---|---|---|---|
| 0.03 | 0 | 9 | |
| 0 | 0.50 | 46 | |
| 0.03 | 0.50 | 72 | 51 |

TABLE 33

Antimicrobial activity of each compound on *Pyrenophora graminea*

| Azole derivative I-23 ppm | Fluoxastrobin ppm | Actual fungal growth inhibition rate (%) % | Expected fungal growth inhibition rate (%) % |
|---|---|---|---|
| 0.50 | 0 | 91 | |
| 0.13 | 0 | 81 | |
| 0 | 0.50 | 59 | |
| 0.50 | 0.50 | 100 | 96 |
| 0.13 | 0.50 | 95 | 92 |
| 0 | 0.13 | 51 | |
| 0.50 | 0.13 | 100 | 95 |
| 0.13 | 0.13 | 98 | 90 |

TABLE 34

Antimicrobial activity of each compound on *Microdocum nivale*

| Azole derivative I-23 ppm | Fluoxastrobin ppm | Actual fungal growth inhibition rate (%) % | Expected fungal growth inhibition rate (%) % |
|---|---|---|---|
| 0.50 | 0 | 27 | |
| 0.13 | 0 | 4 | |
| 0.01 | 0 | 0 | |
| 0 | 0.01 | 96 | |
| 0.50 | 0.01 | 100 | 97 |
| 0.13 | 0.01 | 100 | 96 |
| 0.01 | 0.01 | 100 | 96 |

TABLE 35

Antimicrobial activity of each compound on *Gaeumannomyces graminis*

| Azole derivative I-23 ppm | Prothioconazole ppm | Actual fungal growth inhibition rate (%) % | Expected fungal growth inhibition rate (%) % |
|---|---|---|---|
| 0.03 | 0 | 38 | |
| 0.01 | 0 | 0 | |
| 0 | 0.50 | 36 | |
| 0.03 | 0.50 | 91 | 61 |
| 0.01 | 0.50 | 52 | 36 |
| 0 | 0.13 | 0 | |
| 0.03 | 0.13 | 95 | 38 |
| 0.01 | 0.13 | 33 | 0 |

TABLE 36

Antimicrobial activity of each compound on
*Glomerella cingulata*

| Azole derivative I-23 ppm | Prothioconazole ppm | Actual fungal growth inhibition rate (%) % | Expected fungal growth inhibition rate (%) % |
|---|---|---|---|
| 0.50 | 0 | 61 | |
| 0.13 | 0 | 31 | |
| 0 | 0.50 | 24 | |
| 0.50 | 0.50 | 86 | 71 |
| 0.13 | 0.50 | 56 | 48 |

TABLE 37

Antimicrobial activity of each compound on
*Penicillium italicum*

| Azole derivative I-23 ppm | Prothioconazole ppm | Actual fungal growth inhibition rate (%) % | Expected fungal growth inhibition rate (%) % |
|---|---|---|---|
| 0.50 | 0 | 43 | |
| 0 | 0.13 | 18 | |
| 0.50 | 0.13 | 70 | 54 |

TABLE 38

Antimicrobial activity of each compound on
*Microdocum nivale*

| Azole derivative I-23 ppm | Mefentrifluconazole ppm | Actual fungal growth inhibition rate (%) % | Expected fungal growth inhibition rate (%) % |
|---|---|---|---|
| 0.50 | 0 | 24 | |
| 0.13 | 0 | 10 | |
| 0 | 0.01 | 1 | |
| 0.50 | 0.01 | 32 | 25 |
| 0.13 | 0.01 | 28 | 11 |

TABLE 39

Antimicrobial activity of each compound on
*Alternaria alternata* apple pathotype

| Azole derivative I-23 ppm | Mefentrifluconazole ppm | Actual fungal growth inhibition rate (%) % | Expected fungal growth inhibition rate (%) % |
|---|---|---|---|
| 0.13 | 0 | 0 | |
| 0.03 | 0 | 0 | |
| 0 | 0.50 | 62 | |
| 0.13 | 0.50 | 69 | 62 |
| 0.03 | 0.50 | 69 | 62 |

Test Examples 39 to 49: In Vitro Antimicrobial
Activity Test Using Azole Derivative I-122 and
Other Fungicides In the present test example, the antimicrobial activity of a mixed formulation of the azole derivative I-122 and other fungicides (bixafen, fluxapyroxad, trifloxystrobin, fluoxastrobin, prothioconazole, and mefentrifluconazole) against plant pathogenic fungus (*Fusarium graminearum, Gaeumannomyces graminis, Pyrenophora graminea, Microdocum nivale, Alternaria alternata* apple pathotype, and *Glomerella cingulata*) listed in the following tables was tested.

The test method, evaluation method, and others are the same as those in Test Example 3 above, except that the composition of the chemical to be mixed with the azole derivative I-122 was changed and the fungi species was changed. The results are shown in Tables 40 to 50.

As shown in Tables 40 to 50, the fungal growth inhibition rate of the mixture of the azole derivative I-122 and bixafen, fluxapyroxad, trifloxystrobin, fluoxastrobin, prothioconazole, or mefentrifluconazole was larger than the theoretical value calculated from the inhibition rate when each chemical was used alone, indicating the synergistic effect of the azole derivative I-122 and these fungicides.

TABLE 40

Antimicrobial activity of each compound on
*Fusarium graminearum*

| Azole derivative I-122 ppm | Bixafen ppm | Actual fungal growth inhibition rate (%) % | Expected fungal growth inhibition rate (%) % |
|---|---|---|---|
| 5.00 | 0 | 83 | |
| 0 | 0.10 | 0 | |
| 5.00 | 0.10 | 94 | 83 |

TABLE 41

Antimicrobial activity of each compound on
*Gaeumannomyces graminis*

| Azole derivative I-122 ppm | Fluxapyroxad ppm | Actual fungal growth inhibition rate (%) % | Expected fungal growth inhibition rate (%) % |
|---|---|---|---|
| 1.25 | 0 | 96 | |
| 0.31 | 0 | 96 | |
| 0 | 1.56 | 0 | |
| 1.25 | 1.56 | 98 | 96 |
| 0.31 | 1.56 | 97 | 96 |
| 0 | 0.10 | 0 | |
| 1.25 | 0.10 | 97 | 96 |
| 0.31 | 0.10 | 97 | 96 |

TABLE 42

Antimicrobial activity of each compound on
*Pyrenophora graminea*

| Azole derivative I-122 ppm | Trifloxystrobin ppm | Actual fungal growth inhibition rate (%) % | Expected fungal growth inhibition rate (%) % |
|---|---|---|---|
| 0.50 | 0 | 82 | |
| 0.13 | 0 | 75 | |
| 0 | 0.50 | 55 | |
| 0.50 | 0.50 | 100 | 92 |
| 0.13 | 0.50 | 95 | 89 |
| 0 | 0.13 | 54 | |
| 0.50 | 0.13 | 100 | 92 |
| 0.13 | 0.13 | 92 | 89 |

TABLE 43

Antimicrobial activity of each compound on *Microdocum nivale*

| Azole derivative I-122 ppm | Trifloxystrobin ppm | Actual fungal growth inhibition rate (%) % | Expected fungal growth inhibition rate (%) % |
|---|---|---|---|
| 0.13 | 0 | 4 | |
| 0.03 | 0 | 0 | |
| 0.01 | 0 | 0 | |
| 0 | 0.03 | 65 | |
| 0.13 | 0.03 | 69 | 66 |
| 0.03 | 0.03 | 70 | 65 |
| 0.01 | 0.03 | 77 | 65 |

TABLE 44

Antimicrobial activity of each compound on *Gaeumannomyces graminis*

| Azole derivative I-122 ppm | Trifloxystrobin ppm | Actual fungal growth inhibition rate (%) % | Expected fungal growth inhibition rate (%) % |
|---|---|---|---|
| 0.50 | 0 | 97 | |
| 0.13 | 0 | 70 | |
| 0 | 0.50 | 9 | |
| 0.50 | 0.50 | 100 | 97 |
| 0.13 | 0.50 | 74 | 73 |

TABLE 45

Antimicrobial activity of each compound on *Gaeumannomyces graminis*

| Azole derivative I-122 ppm | Fluoxastrobin ppm | Actual fungal growth inhibition rate (%) % | Expected fungal growth inhibition rate (%) % |
|---|---|---|---|
| 0.13 | 0 | 57 | |
| 0 | 0.01 | 32 | |
| 0.13 | 0.01 | 100 | 71 |

TABLE 46

Antimicrobial activity of each compound on *Alternaria alternata* apple pathotype

| Azole derivative I-122 ppm | Fluoxastrobin ppm | Actual fungal growth inhibition rate (%) % | Expected fungal growth inhibition rate (%) % |
|---|---|---|---|
| 0.50 | 0 | 5 | |
| 0.13 | 0 | 0 | |
| 0 | 0.50 | 43 | |
| 0.50 | 0.50 | 50 | 46 |
| 0.13 | 0.50 | 50 | 43 |

TABLE 47

Antimicrobial activity of each compound on *Microdocum nivale*

| Azole derivative I-122 ppm | Prothioconazole ppm | Actual fungal growth inhibition rate (%) % | Expected fungal growth inhibition rate (%) % |
|---|---|---|---|
| 0 | 0.13 | 13 | |
| 0.50 | 0.13 | 64 | 50 |

TABLE 48

Antimicrobial activity of each compound on *Glomerella cingulata*

| Azole derivative I-122 ppm | Prothioconazole ppm | Actual fungal growth inhibition rate (%) % | Expected fungal growth inhibition rate (%) % |
|---|---|---|---|
| 0.50 | 0 | 82 | |
| 0.13 | 0 | 45 | |
| 0 | 0.13 | 0 | |
| 0.50 | 0.13 | 84 | 82 |
| 0.13 | 0.13 | 55 | 45 |
| 0 | 0.01 | 0 | |
| 0.50 | 0.01 | 87 | 82 |
| 0.13 | 0.01 | 55 | 45 |

TABLE 49

Antimicrobial activity of each compound on *Gaeumannomyces graminis*

| Azole derivative I-122 ppm | Mefentrifluconazole ppm | Actual fungal growth inhibition rate (%) % | Expected fungal growth inhibition rate (%) % |
|---|---|---|---|
| 0.03 | 0 | 32 | |
| 0.01 | 0 | 0 | |
| 0 | 0.03 | 19 | |
| 0.03 | 0.03 | 88 | 45 |
| 0.01 | 0.03 | 61 | 19 |

TABLE 50

Antimicrobial activity of each compound on *Glomerella cingulata*

| Azole derivative I-122 ppm | Mefentrifluconazole ppm | Actual fungal growth inhibition rate (%) % | Expected fungal growth inhibition rate (%) % |
|---|---|---|---|
| 0.03 | 0 | 14 | |
| 0.01 | 0 | 8 | |
| 0 | 0.50 | 77 | |
| 0.03 | 0.50 | 87 | 80 |
| 0.01 | 0.50 | 82 | 79 |

Test Examples 50 to 59: In Vitro Antimicrobial Activity Test Using Azole Derivative I-228 and Other Fungicides In the present test example, the antimicrobial activity of a mixed formulation of the azole derivative I-228 and other fungicides (bixafen, fluxapyroxad, trifloxystrobin, fluoxastrobin, prothioconazole, and mefentrifluconazole) against plant pathogenic fungus (*Microdocum nivale, Gaeumanno-* myces graminis, *Fusarium fujikuroi*, *Pyrenophora graminea*, *Glomerella cingulata*, *Fusarium graminearum*, and *Penicillium italicum*) listed in the following tables was tested.

The test method, evaluation method, and others are the same as those in Test Example 3 above, except that the composition of the chemical to be mixed with the azole derivative I-228 was changed and the fungi species was changed. The results are shown in Tables 51 to 60.

As shown in Tables 51 to 60, the fungal growth inhibition rate of the mixture of the azole derivative I-228 and bixafen, fluxapyroxad, trifloxystrobin, fluoxastrobin, prothioconazole, or mefentrifluconazole was larger than the theoretical value calculated from the inhibition rate when each chemical was used alone, indicating the synergistic effect of the azole derivative I-228 and these fungicides.

TABLE 51

Antimicrobial activity of each compound on *Microdocum nivale*

| Azole derivative I-228 ppm | Bixafen ppm | Actual fungal growth inhibition rate (%) % | Expected fungal growth inhibition rate (%) % |
|---|---|---|---|
| 5.00 | 0 | 86 | |
| 1.25 | 0 | 56 | |
| 0 | 0.10 | 0 | |
| 5.00 | 0.10 | 91 | 86 |
| 1.25 | 0.10 | 60 | 56 |

TABLE 52

Antimicrobial activity of each compound on *Gaeumannomyces graminis*

| Azole derivative I-228 ppm | Fluxapyroxad ppm | Actual fungal growth inhibition rate (%) % | Expected fungal growth inhibition rate (%) % |
|---|---|---|---|
| 5.00 | 0 | 71 | |
| 1.25 | 0 | 67 | |
| 0.31 | 0 | 63 | |
| 0 | 1.56 | 9 | |
| 5.00 | 1.56 | 96 | 74 |
| 1.25 | 1.56 | 96 | 70 |
| 0.31 | 1.56 | 92 | 67 |

TABLE 53

Antimicrobial activity of each compound on *Gaeumannomyces graminis*

| Azole derivative I-228 ppm | Trifloxy-strobin ppm | Actual fungal growth inhibition rate (%) % | Expected fungal growth inhibition rate (%) % |
|---|---|---|---|
| 0.13 | 0 | 89 | |
| 0 | 0.13 | 11 | |
| 0.13 | 0.13 | 99 | 90 |
| 0 | 0.03 | 5 | |
| 0.13 | 0.03 | 99 | 90 |

TABLE 54

Antimicrobial activity of each compound on *Fusarium fujikuroi*

| Azole derivative I-228 ppm | Trifloxy-strobin Ppm | Actual fungal growth inhibition rate (%) % | Expected fungal growth inhibition rate (%) % |
|---|---|---|---|
| 0.50 | 0 | 21 | |
| 0 | 0.01 | 10 | |
| 0.50 | 0.01 | 54 | 29 |
| 0 | 0.002 | 0 | |
| 0.50 | 0.002 | 66 | 21 |

TABLE 55

Antimicrobial activity of each compound on *Pyrenophora graminea*

| Azole derivative I-228 ppm | Fluoxa-strobin ppm | Actual fungal growth inhibition rate (%) % | Expected fungal growth inhibition rate (%) % |
|---|---|---|---|
| 0.50 | 0 | 84 | |
| 0 | 0.50 | 51 | |
| 0.50 | 0.50 | 100 | 92 |
| 0 | 0.13 | 46 | |
| 0.50 | 0.13 | 100 | 91 |

TABLE 56

Antimicrobial activity of each compound on *Glomerella cingulata*

| Azole derivative I-228 ppm | Fluoxa-strobin ppm | Actual fungal growth inhibition rate (%) % | Expected fungal growth inhibition rate (%) % |
|---|---|---|---|
| 0.03 | 0 | 12 | |
| 0.01 | 0 | 2 | |
| 0 | 0.50 | 48 | |
| 0.03 | 0.50 | 60 | 54 |
| 0.01 | 0.50 | 57 | 49 |

TABLE 57

Antimicrobial activity of each compound on *Fusarium graminearum*

| Azole derivative I-228 ppm | Prothio-conazole ppm | Actual fungal growth inhibition rate (%) % | Expected fungal growth inhibition rate (%) % |
|---|---|---|---|
| 0.50 | 0 | 39 | |
| 0 | 0.03 | 19 | |
| 0.50 | 0.03 | 61 | 51 |
| 0 | 0.01 | 1 | |
| 0.50 | 0.01 | 47 | 40 |

TABLE 58

Antimicrobial activity of each compound on *Glomerella cingulata*

| Azole derivative I-228 ppm | Prothio-conazole ppm | Actual fungal growth inhibition rate (%) % | Expected fungal growth inhibition rate (%) % |
|---|---|---|---|
| 0.50 | 0 | 82 | |
| 0 | 0.03 | 1 | |

TABLE 58-continued

Antimicrobial activity of each compound on *Glomerella cingulata*

| Azole derivative I-228 ppm | Prothio-conazole ppm | Actual fungal growth inhibition rate (%) % | Expected fungal growth inhibition rate (%) % |
|---|---|---|---|
| 0.50 | 0.03 | 87 | 82 |
| 0 | 0.01 | 0 | |
| 0.50 | 0.01 | 86 | 82 |

TABLE 59

Antimicrobial activity of each compound on *Penicillium italicum*

| Azole derivative I-228 ppm | Prothio-conazole ppm | Actual fungal growth inhibition rate (%) % | Expected fungal growth inhibition rate (%) % |
|---|---|---|---|
| 0.13 | 0 | 56 | |
| 0 | 0.13 | 19 | |
| 0.13 | 0.13 | 75 | 64 |

TABLE 60

Antimicrobial activity of each compound on *Glomerella cingulata*

| Azole derivative I-228 ppm | Mefentrifluconazole ppm | Actual fungal growth inhibition rate (%) % | Expected fungal growth inhibition rate (%) % |
|---|---|---|---|
| 0.03 | 0 | 16 | |
| 0.01 | 0 | 0 | |
| 0 | 0.13 | 74 | |
| 0.03 | 0.13 | 83 | 78 |
| 0.01 | 0.13 | 79 | 74 |

INDUSTRIAL APPLICABILITY

The present invention can be used as a controlling agent that can control plant diseases while limiting harmful effects to the plant.

The invention claimed is:

1. An agricultural fungicidal composition having antifungal activities against plant pathogenic fungi, the agricultural fungicidal composition comprising an azole derivative represented by general formula (I) as an active ingredient, and further comprising another active ingredient, wherein the content of the azole derivative represented by general formula (I) in the agricultural fungicidal composition is from 0.1 to 95% by weight, and the another active ingredient comprises at least one selected from azoxystrobin, pydiflumetofen, carbendazim, penthiopyrad, trifloxystrobin, fluoxastrobin, fluopyram, bixafen, spiroxamine, prothioconazole, mefentrifluconazole, metyltetraprole, metconazole, isoflucypram, fenpicoxamid, and fluxapyroxad,

[general formula (1)]

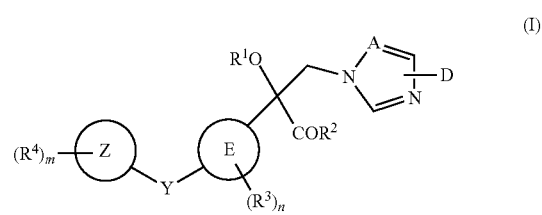

wherein
A is N;
D is hydrogen;
$R^1$ is hydrogen;
$COR^2$ is —C(O)OMe;
$R^4$ is Cl, or $CF_3$,
$R^3$ is Cl, $CF_3$, or Br;
E is a phenyl group;
n $R^3$'s are bonded at any substitution positions; n is 1 or 2;
Y is an oxygen atom bonded to any position of E;
Z is a phenyl group;
m $R^4$s are bonded at any substitution positions; and
m is 1 or 2.

2. A method of controlling plant diseases caused by plant pathogenic fungi, comprising applying the agricultural fungicidal composition described in claim 1 to a foliage or non-foliage area.

3. A product for controlling plant diseases caused by plant pathogenic fungi for preparing the agricultural or horticultural fungicide described in claim 1, comprising the azole derivative and the another active ingredient separately as a combination preparation to be mixed before use.

* * * * *